United States Patent
Sakhnini et al.

(10) Patent No.: US 11,711,775 B2
(45) Date of Patent: Jul. 25, 2023

(54) ENERGY PER RESOURCE ELEMENT RATIO FOR SYNCHRONIZATION SIGNAL BLOCK SYMBOLS

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Xiaoxia Zhang, San Diego, CA (US); Jing Sun, San Diego, CA (US); Sungwoo Park, Seoul (KR); Jun Ma, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 85 days.

(21) Appl. No.: 17/308,821

(22) Filed: May 5, 2021

(65) Prior Publication Data
US 2021/0352601 A1 Nov. 11, 2021

Related U.S. Application Data

(60) Provisional application No. 63/021,673, filed on May 7, 2020.

(51) Int. Cl.
*H04J 11/00* (2006.01)
*H04W 4/021* (2018.01)
(Continued)

(52) U.S. Cl.
CPC ....... *H04W 56/001* (2013.01); *H04J 11/0073* (2013.01); *H04J 11/0076* (2013.01); *H04L 27/26025* (2021.01); *H04W 4/021* (2013.01)

(58) Field of Classification Search
CPC ........... H04W 56/001; H04W 56/0005; H04W 56/002; H04W 56/003; H04W 56/0035;
(Continued)

(56) References Cited

U.S. PATENT DOCUMENTS

2013/0294282 A1* 11/2013 Seo ............... H04L 5/0048
370/252
2018/0132114 A1* 5/2018 Sun ............... H04L 5/0048
(Continued)

FOREIGN PATENT DOCUMENTS

CN 110312302 A 10/2019
EP 3480978 A1 5/2019
(Continued)

OTHER PUBLICATIONS

ETSI: "5G; NR; Physical Layer Procedures for Data (3GPP TS 38.214 Version 15.8.0 Release 15)", Physical Layer Procedures for Data (3GPP TS 38.214 Version 15.8.0 Release 15), Sophia Antipolis, France, Jan. 1, 2020 (Jan. 1, 2020), XP055830791, pp. 1-109, Retrieved from the Internet: URL:https://www.etsi.org/deliver/etsi_ts/138200_138299/138214/15.08.00_60/ts_138214v150800p.pdf [retrieved on Aug. 7, 2021] Section 4.
(Continued)

*Primary Examiner* — Phong La
(74) *Attorney, Agent, or Firm* — Holland & Hart LLP

(57) ABSTRACT

Methods, systems, and devices for wireless communications are described. Generally, a user equipment (UE) may identify an energy per resource element (EPRE) ratio between a synchronization signal block (SSB) symbol containing a primary synchronization signal (PSS) and an SSB symbol containing a secondary synchronization signal (SSS), a physical broadcast channel (PBCH), or both, based on an operating band for the UE, a bandwidth of the SSB symbol containing the PSS and the SSB symbol containing the SSB,
(Continued)

the PBCH, or both. The EPRE ratio may be based on maximum regulatory equivalent isotropically radiated power (EIRP) limits, maximum regulatory power spectral density (PSD) limits for the band, or both. The EPRE ratios may be different for different SSB symbols, when different SSB symbols have different bandwidths. A base station may configure and transmit, and a UE may receive, the SSB according to the identified EPRE ratio.

30 Claims, 17 Drawing Sheets

(51) Int. Cl.
*H04W 56/00* (2009.01)
*H04L 27/26* (2006.01)

(58) Field of Classification Search
CPC ... H04W 56/0055; H04W 4/021; H04W 4/02; H04W 4/023; H04W 4/024; H04W 4/025; H04L 27/26025; H04L 27/2603; H04L 27/26035; H04L 27/2602; H04L 27/261; H04J 11/0073; H04J 11/0076; H04J 11/0079; H04J 11/0083; H04J 11/0069
See application file for complete search history.

(56) References Cited

U.S. PATENT DOCUMENTS

| | | | | |
|---|---|---|---|---|
| 2020/0336188 A1* | 10/2020 | Wang | | H04B 7/0695 |
| 2020/0337002 A1* | 10/2020 | Ko | | H04W 72/005 |
| 2020/0351801 A1* | 11/2020 | Jeon | | H04W 52/48 |
| 2021/0051641 A1* | 2/2021 | Si | | H04W 56/0015 |
| 2021/0314045 A1* | 10/2021 | Cha | | H04B 7/063 |
| 2021/0352601 A1* | 11/2021 | Sakhnini | | H04L 27/26025 |
| 2022/0110184 A1* | 4/2022 | Jeon | | H04W 76/28 |
| 2022/0166586 A1* | 5/2022 | Kun | | H04L 5/0037 |
| 2022/0183079 A1* | 6/2022 | Ouchi | | H04W 74/0841 |
| 2022/0272706 A1* | 8/2022 | Sengupta | | H04W 72/0473 |

FOREIGN PATENT DOCUMENTS

| | | | | |
|---|---|---|---|---|
| WO | WO-2019032737 A1 | | 2/2019 | |
| WO | WO-2019032737 A1 * | | 2/2019 | H04L 1/203 |
| WO | WO-2020032691 A1 * | | 2/2020 | H04W 48/16 |
| WO | WO-2020052424 A1 | | 3/2020 | |

OTHER PUBLICATIONS

International Search Report and Written Opinion—PCT/US2021/031165—ISA/EPO—dated Sep. 24, 2021.

* cited by examiner

ENERGY PER RESOURCE ELEMENT RATIO FOR SYNCHRONIZATION SIGNAL BLOCK SYMBOLS

CROSS REFERENCE

The present Application for Patent claims the benefit of U.S. Provisional Patent Application No. 63/021,673 by SAKHNINI et al., entitled "ENERGY PER RESOURCE ELEMENT RATIO FOR SYNCHRONIZATION SIGNAL BLOCK SYMBOLS," filed May 7, 2020, assigned to the assignee hereof, and expressly incorporated by reference herein.

FIELD OF TECHNOLOGY

The following relates generally to wireless communications and more specifically to energy per resource element (EPRE) ratio for synchronization signal block (SSB) symbols.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support energy per resource element (EPRE) ratios for synchronization signal block (SSB) symbols. Scaling of an SSB subcarrier spacing (SCS) for different signals or channels may result in improved timing resolution to benefit data with higher SCS, but at the expense of higher receiver complexity. An SSB may be designed to support primary synchronization signals (PSSs), secondary synchronization signals (SSSs), and broadcast channels (e.g., physical broadcast channels (PBCHs)) with different SCSs. However, even such a scheme may be affected by regulatory power requirements. Power regulatory requirements may be defined for geographic regions and per frequency bands or regions. An SSB may be configured to maximize power without exceeding such regulatory limits by using various EPRE ratios between a PSS and SSS of an SSB, or PSS and PBCH of the SSB. In conventional wireless communications systems, a user equipment (UE) may assume an EPRE ratio of PSS to SSS or PSS to PBCH is equal to one of a small set of possible values (e.g., tow candidate values). The UE may test the small set of hypothesis EPRE ratios, and quickly determine the correct EPRE ratio for receiving the SSB. However, a larger number of possible EPRE ratios for an SSB may improve power efficiency without exceeding, and thus satisfying, regulatory power limits. Some wireless communications systems may not support a larger number of EPRE ratios, resulting in decreased power efficiency. If large numbers of ratios are supported, a large number of hypothesis EPRE values to be tested by the UE may result in decreased efficiency and increased latency at a UE.

To support increased power efficiency without unnecessarily increasing processing complexity at a UE, a UE may identify an EPRE ratio between an SSB symbol containing a PSS and an SSB symbol containing an SSS, a PBCH, or both. This identification may be based on an operating band for the UE, a bandwidth of the SSB symbol containing the PSS, and the SSB symbol containing the SSB, the PBCH, or both. The EPRE ratio may be based on maximum regulatory equivalent isotropically radiated power (EIRP) limits, or maximum regulatory power spectral density (PSD) limits for the band, or both. In some examples, the EPRE ratios may be based on tabulated values with some quantization. In other examples, the EPRE ratios may be calculated values based on a defined formula. In yet other examples, a combination of calculated values based on a defined formula and tabulated values with some quantization may be used. In some examples, the EPRE ratios may be different for different SSB symbols, for example when different SSB symbols have different bandwidths. A base station may configure and transmit an SSB according to the identified EPRE ratio, and a UE may receive the SSB according to the identified EPRE ratio.

A method of wireless communications at a UE is described. The method may include identifying a first bandwidth of a SSB for a first symbol that includes a PSS, identifying a second bandwidth of the SSB for a second symbol that includes one or more of a SSS or a broadcast channel, identifying, based on the first bandwidth, the second bandwidth, and a radio frequency spectrum band in which the UE is operating, an EPRE ratio between the PSS and the one or more of the SSS or the broadcast channel, and receiving the SSB according to the identified EPRE ratio.

An apparatus for wireless communications at a UE is described. The apparatus may include a processor, memory coupled with the processor, and instructions stored in the memory. The instructions may be executable by the processor to cause the apparatus to identify a first bandwidth of a SSB for a first symbol that includes a PSS, identify a second bandwidth of the SSB for a second symbol that includes one or more of a SSS or a broadcast channel, identify, based on the first bandwidth, the second bandwidth, and a radio frequency spectrum band in which the UE is operating, an EPRE ratio between the PSS and the one or more of the SSS or the broadcast channel, and receive the SSB according to the identified EPRE ratio.

Another apparatus for wireless communications at a UE is described. The apparatus may include means for identifying a first bandwidth of a SSB for a first symbol that includes a PSS, identifying a second bandwidth of the SSB for a second symbol that includes one or more of a SSS or a broadcast channel, identifying, based on the first bandwidth, the second bandwidth, and a radio frequency spectrum band in which the UE is operating, an EPRE ratio between the PSS and the one or more of the SSS or the broadcast channel, and receiving the SSB according to the identified EPRE ratio.

A non-transitory computer-readable medium storing code for wireless communications at a UE is described. The code may include instructions executable by a processor to identify a first bandwidth of a SSB for a first symbol that includes a PSS, identify a second bandwidth of the SSB for a second symbol that includes one or more of a SSS or a broadcast channel, identify, based on the first bandwidth, the second bandwidth, and a radio frequency spectrum band in which the UE is operating, an EPRE ratio between the PSS and the one or more of the SSS or the broadcast channel, and receive the SSB according to the identified EPRE ratio.

Some examples of the method, apparatuses, and non-transitory computer-readable medium described herein may further include operations, features, means, or instructions for identifying a threshold EIRP for the radio frequency spectrum band, where identifying the EPRE ratio may be based on the threshold EIRP for the radio frequency spectrum band.

In some examples of the method, apparatuses, and non-transitory computer-readable medium described herein, the threshold EIRP for the radio frequency spectrum band may be based on a geographic location of the UE.

Some examples of the method, apparatuses, and non-transitory computer-readable medium described herein may further include operations, features, means, or instructions for identifying a threshold PSD for the radio frequency spectrum band, where identifying the EPRE ratio may be based on the threshold PSD.

In some examples of the method, apparatuses, and non-transitory computer-readable medium described herein, the threshold PSD for the radio frequency spectrum band may be based on a geographic location of the UE.

In some examples of the method, apparatuses, and non-transitory computer-readable medium described herein, identifying the EPRE ratio between the PSS and the one or more of the SSS or the broadcast channel may include operations, features, means, or instructions for identifying, based on the first bandwidth, the second bandwidth, and the radio frequency spectrum band, an entry in a table, the entry indicating the EPRE ratio.

In some examples of the method, apparatuses, and non-transitory computer-readable medium described herein, the table provides a set of entries indicating a set of EPRE ratios, each EPRE ratio associated with a combination of values that includes a PSS bandwidth and one or more of a SSS bandwidth or a broadcast channel bandwidth.

In some examples of the method, apparatuses, and non-transitory computer-readable medium described herein, the combination of values further includes a first SCS for the PSS and a second SCS for the one or more of the SSS or the broadcast channel.

In some examples of the method, apparatuses, and non-transitory computer-readable medium described herein, the table provides a set of entries indicating a set of EPRE ratios, each EPRE ratio associated with an SSB configuration.

In some examples of the method, apparatuses, and non-transitory computer-readable medium described herein, identifying the EPRE ratio between the PSS and the one or more of the SSS or the broadcast channel may include operations, features, means, or instructions for calculating the EPRE ratio based on the first bandwidth, the second bandwidth, and the radio frequency spectrum band in which the UE may be operating.

Some examples of the method, apparatuses, and non-transitory computer-readable medium described herein may further include operations, features, means, or instructions for identifying a third bandwidth of the SSB for a third symbol that includes one or more of a second SSS or a second broadcast channel, and identifying a second EPRE ratio between the PSS and the one or more of the second SSS or the second broadcast channel based on the first bandwidth, the third bandwidth, and the radio frequency spectrum band in which the UE may be operating, where receiving the SSB may be based on the identified second EPRE ratio.

A method of wireless communications at a base station is described. The method may include identifying a first bandwidth of a SSB for a first symbol that includes a PSS, identifying a second bandwidth of the SSB for a second symbol that includes one or more of a SSS or a broadcast channel, identifying, based on the first bandwidth, the second bandwidth, and a radio frequency spectrum band in which the UE is operating, an EPRE ratio between the PSS and the one or more of the SSS or the broadcast channel, and transmitting the SSB according to the identified EPRE ratio.

An apparatus for wireless communications at a base station is described. The apparatus may include a processor, memory coupled with the processor, and instructions stored in the memory. The instructions may be executable by the processor to cause the apparatus to identify a first bandwidth of a SSB for a first symbol that includes a PSS, identify a second bandwidth of the SSB for a second symbol that includes one or more of a SSS or a broadcast channel, identify, based on the first bandwidth, the second bandwidth, and a radio frequency spectrum band in which the UE is operating, an EPRE ratio between the PSS and the one or more of the SSS or the broadcast channel, and transmit the SSB according to the identified EPRE ratio.

Another apparatus for wireless communications at a base station is described. The apparatus may include means for identifying a first bandwidth of a SSB for a first symbol that includes a PSS, identifying a second bandwidth of the SSB for a second symbol that includes one or more of a SSS or a broadcast channel, identifying, based on the first bandwidth, the second bandwidth, and a radio frequency spectrum band in which the UE is operating, an EPRE ratio between the PSS and the one or more of the SSS or the broadcast channel, and transmitting the SSB according to the identified EPRE ratio.

A non-transitory computer-readable medium storing code for wireless communications at a base station is described. The code may include instructions executable by a processor to identify a first bandwidth of a SSB for a first symbol that includes a PSS, identify a second bandwidth of the SSB for a second symbol that includes one or more of a SSS or a broadcast channel, identify, based on the first bandwidth, the second bandwidth, and a radio frequency spectrum band in which the UE is operating, an EPRE ratio between the PSS and the one or more of the SSS or the broadcast channel, and transmit the SSB according to the identified EPRE ratio.

Some examples of the method, apparatuses, and non-transitory computer-readable medium described herein may further include operations, features, means, or instructions for identifying a threshold EIRP for the radio frequency spectrum band, where identifying the EPRE ratio may be based on the threshold EIRP for the radio frequency spectrum band.

In some examples of the method, apparatuses, and non-transitory computer-readable medium described herein, the threshold EIRP for the radio frequency spectrum band may be based on a geographic location of the UE.

Some examples of the method, apparatuses, and non-transitory computer-readable medium described herein may further include operations, features, means, or instructions for identifying a threshold PSD for the radio frequency spectrum band, where identifying the EPRE ratio may be based on the threshold PSD.

In some examples of the method, apparatuses, and non-transitory computer-readable medium described herein, the threshold PSD for the radio frequency spectrum band may be based on a geographic location of the UE.

In some examples of the method, apparatuses, and non-transitory computer-readable medium described herein, identifying the EPRE ratio between the PSS and the one or more of the SSS or the broadcast channel may include operations, features, means, or instructions for identifying, based on the first bandwidth, the second bandwidth, and the radio frequency spectrum band, an entry in a table, the entry indicating the EPRE ratio.

In some examples of the method, apparatuses, and non-transitory computer-readable medium described herein, the table provides a set of entries indicating a set of EPRE ratios, each EPRE ratio associated with a combination of values that includes a PSS bandwidth and one or more of a SSS bandwidth or a broadcast channel bandwidth.

In some examples of the method, apparatuses, and non-transitory computer-readable medium described herein, the combination of values further includes a first SCS for the PSS and a second SCS for the one or more of the SSS bandwidth or the broadcast channel bandwidth.

In some examples of the method, apparatuses, and non-transitory computer-readable medium described herein, the table provides a set of entries indicating a set of EPRE ratios, each EPRE ratio associated with a SSB configuration.

In some examples of the method, apparatuses, and non-transitory computer-readable medium described herein, identifying the EPRE ratio between the PSS and the one or more of the SSS or the broadcast channel may include operations, features, means, or instructions for calculating the EPRE ratio based on the first bandwidth, the second bandwidth, and the radio frequency spectrum band in which the UE may be operating.

Some examples of the method, apparatuses, and non-transitory computer-readable medium described herein may further include operations, features, means, or instructions for identifying a third bandwidth of the SSB for a third symbol that includes one or more of a second SSS or a second broadcast channel, and identifying a second EPRE ratio between the PSS and the one or more of the second SSS or the second broadcast channel based on the first bandwidth, the third bandwidth, and the radio frequency spectrum band in which the UE may be operating, where transmitting the SSB may be based on the identified second EPRE ratio.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
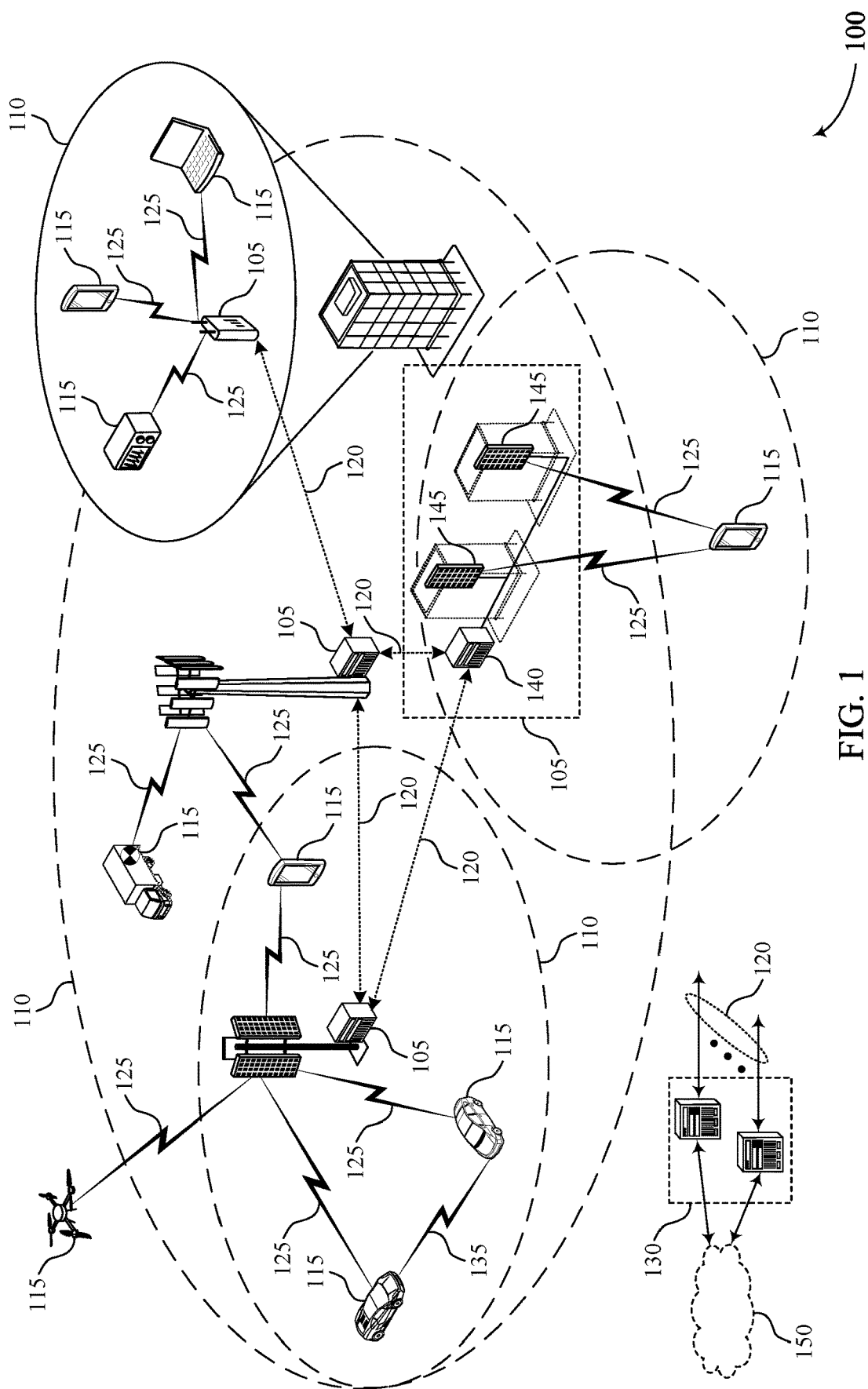
FIG. 1 illustrates an example of a system for wireless communications that supports energy per resource element (EPRE) ratio for synchronization signal block (SSB) symbols in accordance with aspects of the present disclosure.

Some wireless communications systems (e.g., a new radio (NR) system) may support high operating bands (e.g., a 52.6 GHz band) with large subcarrier spacing (SCS) (e.g., 960 kHz, 1920 kHz, 1920 kHz, 3840 kHz, etc.). Such SCS may support large bandwidth manageable fast Fourier transform (FFT) sizes. A base station may transmit a synchronization system block (SSB) to a user equipment (UE) using the large SCS, which may result in large frequency offsets and a smaller number of decoding hypotheses for the UE, decreased transmission time interval (TTI) durations and less blockage to other signals and channels, and improved timing resolution due to shorter OFDM symbols. However, large SCS may also result in more searcher complexity. That is, a user equipment (UE) may have a reduced amount of time in which to detect a primary synchronization signal (PSS) in the SSB. Additionally, large SCS may result in decreased coverage and loss of link budget. For instance, regulatory limits may constrain maximum transmit power. For wider bandwidths, to avoid exceeding a maximum permitted transmit power, a power spectral density (PSD) in dBM/Hz may be reduced, which may result in loss of link budget and decreased coverage areas. For instance, for an NR SSB, a transmit power may be maxed out at 50 MHz BW. For an SCS of 240 kHz, the channel may experience a 0.6 dB loss. However, for higher SCSs (e.g., 480 kHz, 960 MHz, or the like), a channel may experience much greater loss (e.g., 3.6 dB for a 480 kHz SCS, or 6.6 dB for a 960 kHz SCS).

Scaling of an SSB SCS for different signals or channels may result in improved timing resolution to benefit data with higher SCS, but at the expense of higher receiver complexity. An SSB may be designed to support PSSs, secondary synchronization signals (SSS), and broadcast channels (e.g., physical broadcast channels (PBCHs)) with different SCSs. For instance, a PSS SCS (e.g., 120 kHz) may be less than an SSS SCS (e.g., 240 kHz). A receiving UE may receive the PSS at the lower SCS and longer TTI duration to obtain coarse timing resolution at a manageable complexity. The UE may then obtain the finer timing resolution using the SSS received at a higher SCS and shorter TTI duration. However, even such a scheme may be limited by regulatory power requirements. Power regulatory requirements may be defined for geographic regions and per frequency bands or regions. An SSB may be configured to maximize power without exceeding such regulatory limits by using various energy per resource element (EPRE) ratios between a PSS and SSS or PSS and PBCH of an SSB. In conventional wireless communications systems, a UE may assume an EPRE ratio of PSS to SSS or PSS to PBCH is equal to one of a small set of possible values (e.g., two candidate ratio values). The UE may test the small set of hypothesis EPRE ratios, and quickly determine the correct EPRE ratio for receiving the SSB. However, a larger number of possible EPRE ratios for an SSB may improve power efficiency without exceeding regulatory power limits. Some wireless communications systems may not support larger number of EPRE ratios, resulting in decreased power efficiency. If large numbers of ratios are supported, a large number of hypothesis EPRE values to be tested by the UE may result in decreased efficiency and increased latency at a UE.

To support increased power efficiency without unnecessarily increasing processing complexity at a UE, a UE may identify an EPRE ratio between an SSB symbol containing a PSS and an SSB symbol containing an SSS, a PBCH, or both, based on an operating band for the UE, a bandwidth of the SSB symbol containing the PSS and the SSB symbol containing the SSB, the PBCH, or both. The EPRE ratio may be based on maximum regulatory equivalent isotropically radiated power (EIRP) limits, or maximum regulatory PSD limits for the band, or both. EIRP may refer to a maximum amount of power that an antenna can radiate isotropically (e.g., omnidirectionally), and may be determined based on an antenna gain, transmitter power, or both. PSD may refer to a distribution of power into component frequencies included in a signal. The EPRE ratios may be based on tabulated values with some quantization, calculated values based on a defined formula, or a combination. In some examples, the EPRE ratios may be different for different SSB symbols, when different SSB symbols have different bandwidths. A base station may configure and transmit an SSB according to the identified EPRE ratio, and a UE may receive the SSB according to the identified EPRE ratio.

Aspects of the disclosure are initially described in the context of wireless communications systems. Aspects of the disclosure are further illustrated by and described with reference to SSBs and process flows. Aspects of the disclosure are further illustrated by and described with reference to apparatus diagrams, system diagrams, and flowcharts that relate to EPRE ratios for SSB symbols.

FIG. 1 illustrates an example of a wireless communications system 100 that supports EPRE ratios for SSB symbols in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To support increased power efficiency without unnecessarily increasing processing complexity at a UE 115, a UE 115 may identify an EPRE ratio between an SSB symbol containing a PSS and an SSB symbol containing an SSS, a PBCH, or both, based on an operating band for the UE 115, a bandwidth of the SSB symbol containing the PSS and the SSB symbol containing the SSB, SSB and PBCH, or PBCH. The EPRE ratio may be based on maximum regulatory EIRP limits, maximum regulatory PSD limits for the band, or both. The EPRE ratios may be based on tabulated values with some quantization, calculated values based on a defined formula, or a combination thereof. In some examples, the EPRE ratios may be different for different SSB symbols, when different SSB symbols have different bandwidths. A base station may configure and transmit an SSB according to the identified EPRE ratio, and a UE 115 may receive the SSB according to the identified EPRE ratio.

Figure 2:
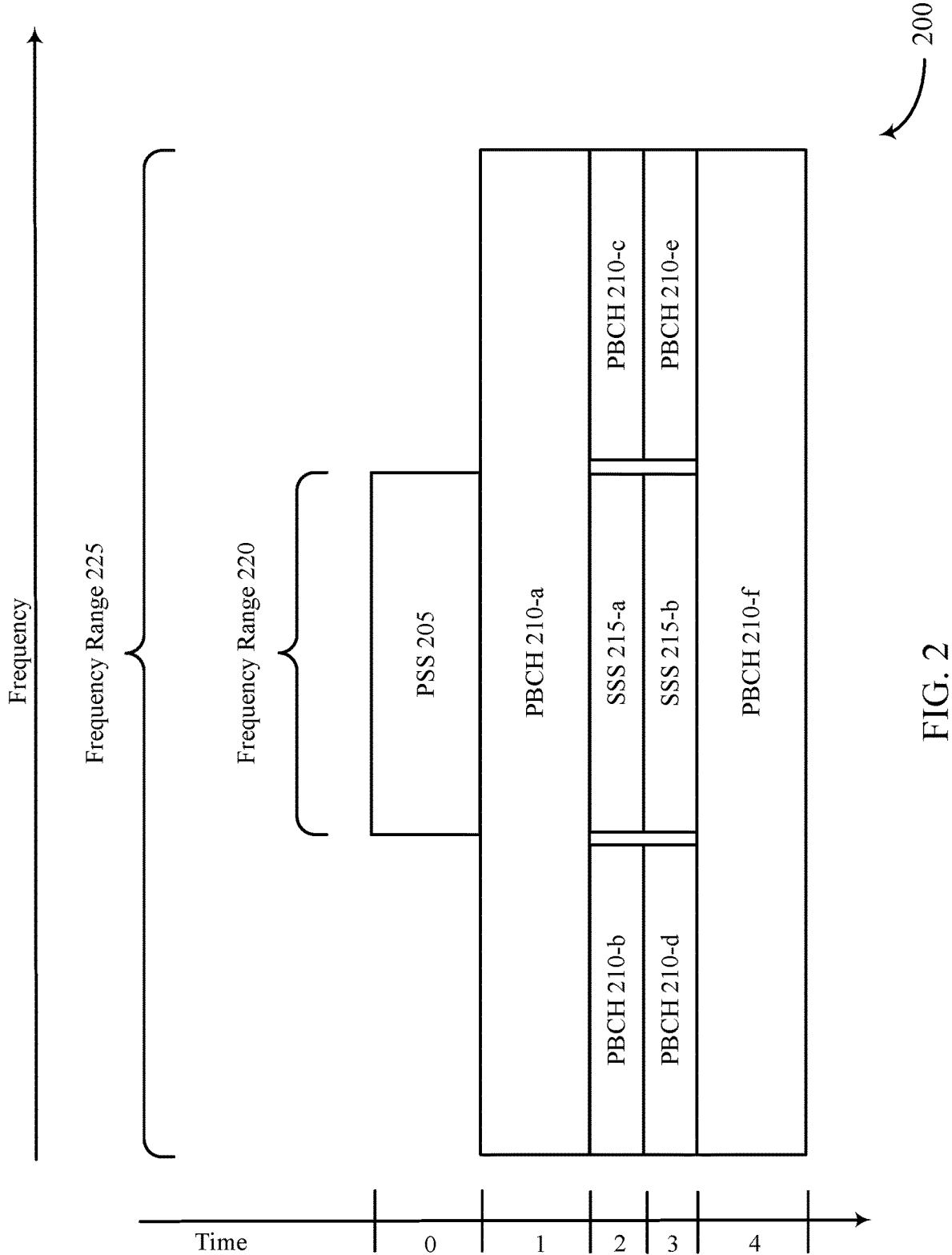
FIG. 2 illustrates an example of an SSB that supports EPRE ratios for SSB symbols in accordance with aspects of the present disclosure.

FIG. 2 illustrates an example of an SSB 200 that supports EPRE ratios for SSB symbols in accordance with aspects of the present disclosure. In some examples, SSB 200 may implement aspects of wireless communication system 100. A base station 105, which may be an example of corresponding devices described with reference to FIG. 1, may transmit an SSB 200 to a UE 115, which may be an example of corresponding devices described with reference to FIG. 1.

A wireless communications system, such as wireless communications system 100 (e.g., an NR system), may support high operating bands (e.g., 52.6 GHz) and large SCS (e.g., 960 kHz, 1920 kHz, 1920 kHz, 3840 kHz, etc.). Such SCS may support large bandwidth FFT sizes.

A base station 105 may transmit an SSB using the large SCS, which may result in various advantages. For instance, in receiving and decoding an SSB, a UE 115 may be capable of supporting large frequency offsets and a smaller number of decoding hypotheses. The UE 115 may receive the SSB over decreased TTI durations and with less blockage to other signals and channels. Additionally, the UE 115 may experience improved timing resolution due to shorter OFDM symbols. Initial cell search timing resolution may be smaller than that of a cyclic prefix for data carried over a physical downlink control channel (PDCCH) or a physical downlink shared channel (PDSCH). For instance, a cyclic prefix for a high SCS for data may be 73.2 nano-seconds (ns) for an SCS of 960 kHz, 36.6 ns for an SCS of 1920 kHz, or 18.3 ns for a SCS of 3840 kHz. For an SCS of 120 kHz, a 28.8 MHz SSB bandwidth may correspond to a timing resolution of 34.7 ns. The SSB signaling using the SCS of 120 kHz may use a cyclic prefix that is greater than that of a 3.84 MHz SCS. For an SCS of 240 kHz, a 57.6 MHz SSB bandwidth may correspond to a timing resolution of 17.4 ns. The SSB signaling using the SCS of 240 kHz may use a cyclic prefix that is less than that of a 3.84 MHz SCS.

However, large SCS may also result in increased searcher complexity, decreased coverage, or both. For example, shorter OFDM symbols may lead to increased searcher complexity for the UE 115. The UE 115 may have a reduced amount of time in which to detect a PSS in the SSB. Additionally, large SCS may result in decreased coverage and loss of link budget. For instance, regulatory limits may constrain maximum transmit power. For wider bandwidths, to avoid exceeding a maximum permitted transmit power, a PSD in dBM/Hz may be reduced, which may result in loss of link budget and decreased coverage areas. For instance, for an NR SSB, a transmit power may be maxed out at 50 MHz BW. For an SCS of 240 kHz, the channel may experience a 0.6 dB loss. However, for higher SCSs (e.g., 480 kHz, 960 MHz, or the like), a channel may experience much greater loss (e.g., 3.6 dB for a 480 kHz SCS, or 6.6 dB for a 960 kHz SCS). For instance, a channel with an SCS of 480 kHz may experience a loss of 3.6 dB, and a channel with an SCS of 960 kHz may experience a loss of 6.6 dB.

In some examples, scaling of an SSB SCS for different signals or channels of an SSB 200 may result in improved timing resolution to benefit data with higher SCS, but at the expense of higher receiver complexity. Some wireless communications systems may support an SSB with a same SCS for PSSs, SSSs, and PBCHs. However, an SSB 200 may be designed to support PSSs, SSSs, and PBCHs with different SCSs. For instance, an SCS for PSS 205 (e.g., 120 kHz) may be less than an SCS for SSS 215 (e.g., 240 kHz).

For instance, SSB 200 may include a PSS 205 spanning a frequency range 220 (e.g., 127 subcarriers). PSS 205 may be located in symbol 0 of SSB 200, and a base station 105 may transmit the PSS 205 using a first SCS. SSB 200 may also include various symbols including PBCHs 210 in one or more symbols. For instance, symbol 1 may include PBCH 210-a, and symbol 4 may include PBCH 210-f both of which may be transmitted at the same SCS as PSS 205. SSS 215-a may be located in symbol 2, and SSS 215-b may be located in symbol 3 of SSB 200. In some examples, SSS 215-a and SSS 215-b may have a different SCS than PSS 205. For instance, SSSs 215 may have an SCS that is double the SCS of PSS 205. In some examples, one or more PBCHs 210 may be multiplexed (e.g., via frequency domain multiplexing (FDM)) into a symbol with an SSS 215. For instance, PBCH 210-b and PBCH 210-c may be located in symbol 2, and PBCH 210-d and PBCH 210-e may be located in symbol 3. In such cases, PBCH 210-b, PBCH 210-c, PBCH 210-d and PBCH 210-e may have the same SCS as SSS 215-a, which may be double the SCS of PSS 205. Because different SCSs are generally associated with different numerologies, where the symbol duration is inversely related to the SCS (e.g., inversely proportional), various channels of SSB 200 may have different symbol (e.g., TTI) durations. For instance, symbol 0, symbol 1, and symbol 4 may have a longer symbol duration than symbols 2 and 3.

UE 115 may receive PSS 205, and may be capable of obtaining coarse timing from PSS 205 (e.g., due to the longer duration of symbol 0). That is, UE 115 may search for PSS 205 using a manageable complexity due to the OFDM symbol length of symbol 0. The UE 115 may then search and detect PSS 205 using the coarse timing resolution (e.g., 34.7 ns). However, such timing resolution may not be sufficient to receive data using much higher SCS (e.g., 3480 kHz). The UE 115 may then get fine timing resolution using SSS 215. Because UE 115 may already know the coarse timing, the searcher may use the SSS 215-a and SSS 215-b (which have smaller symbol lengths), to fine tune the timing resolution (e.g., 17.4 ns. The fine tuning using SSS 215-a and SSS 215-b may resulting in timing resolution sufficient for data channels using a larger SCS (e.g., 3840 MHz).

However, even such a scheme may be limited by regulatory power requirements. Regulatory power requirements may be defined for geographic regions and per frequency bands or regions. For example, for a band containing 57 to 71 GHz, a regulatory requirement may be a maximum EIRP limit equal to 40 dBm, and a maximum PSD equal to 23 dBm/Mhz. Thus, a 50 MHz maximum bandwidth can support the maximum PSD within the maximum EIRP limit. Any bandwidth higher than the maximum bandwidth (e.g., 50 MHz), will have to lower its PSD which may result in decreased coverage and decreased link budget.

An SSB 200 may be configured to maximize power without exceeding such regulatory limits by using various EPRE ratios between a PSS 205 and SSS 215 or PSS 205 and PBCH 210 of an SSB 200. In conventional wireless communications systems, a UE 115 may assume an EPRE ratio of PSS 205 and SSS 215 or PSS 205 and PBCH 210 is equal to one of a small set of possible values. For instance, an NR system may support a power boost for a PSS 305 of either 0 dB or 3 dB with respect to an SSS 215. A UE 115 may assume that the ratio of PSS EPRE to SSS EPRE in an SSB is either 0 dB or 3 dB. Thus, for such a small number of hypotheses, the UE 115 may test the small set of hypothesis EPRE ratios, and quickly determine the correct EPRE ratio for receiving the SSB 200. However, a larger number of possible EPRE ratios for an SSB 200 may improve power efficiency without exceeding regulatory power limits. Some wireless communications systems may not support larger number of EPRE ratios, resulting in decreased power efficiency. For instance, for higher SCS (e.g., 240 kHz), a bandwidth for PSS 205 may be equal to 34.56 MHz. The symbol containing SSS 215-a or the symbol containing SSS 215-b may have a bandwidth of 57.6 MHz. The PSD for PSS 205 may be 23 dBM/MHz, because the PSS bandwidth is less than 50 MHz. The PSD for SSS 215 may be defined by 40-10 $\log_{10}$ (57.6)=22.4 dBm/Mhz. A PSD offset between PSS 205 and SSS 215 may be 0.6 dB. In a wireless communications system that does not support more than two hypothesis PSD offsets (e.g., 0 dB or 3 dB), an offset of 0.6 dB (which may be more efficient than 0 dB or 3dB), may not be supported. Multiple EPRE ratios may be more efficient. Even if a large number of EPRE ratios are supported, a large number of hypothesis EPRE values to be tested by the UE 115 may result in decreased efficiency and increased latency at a UE 115.

As described in greater detail with reference to FIG. 5, a UE 115 may identify a bandwidth of a symbol in which PSS 205 is located (e.g., frequency range 220), and a bandwidth of a symbol in which SSS 215 is located (e.g., frequency range 225, which may span 240 subcarriers), a bandwidth of a symbol in which PBCH 210 is located (e.g., frequency range 225), or a combination thereof. The UE 115 may calculate an EPRE ratio between PSS 205 and either SSS 315 or PBCH 310, or perform a lookup function to identify an EPRE ratio between PSS 205 and either SSS 315 or PBCH 310, based on the identified bandwidths, and based on a radio frequency spectrum band on which the UE 115 is operating.

Figure 3:
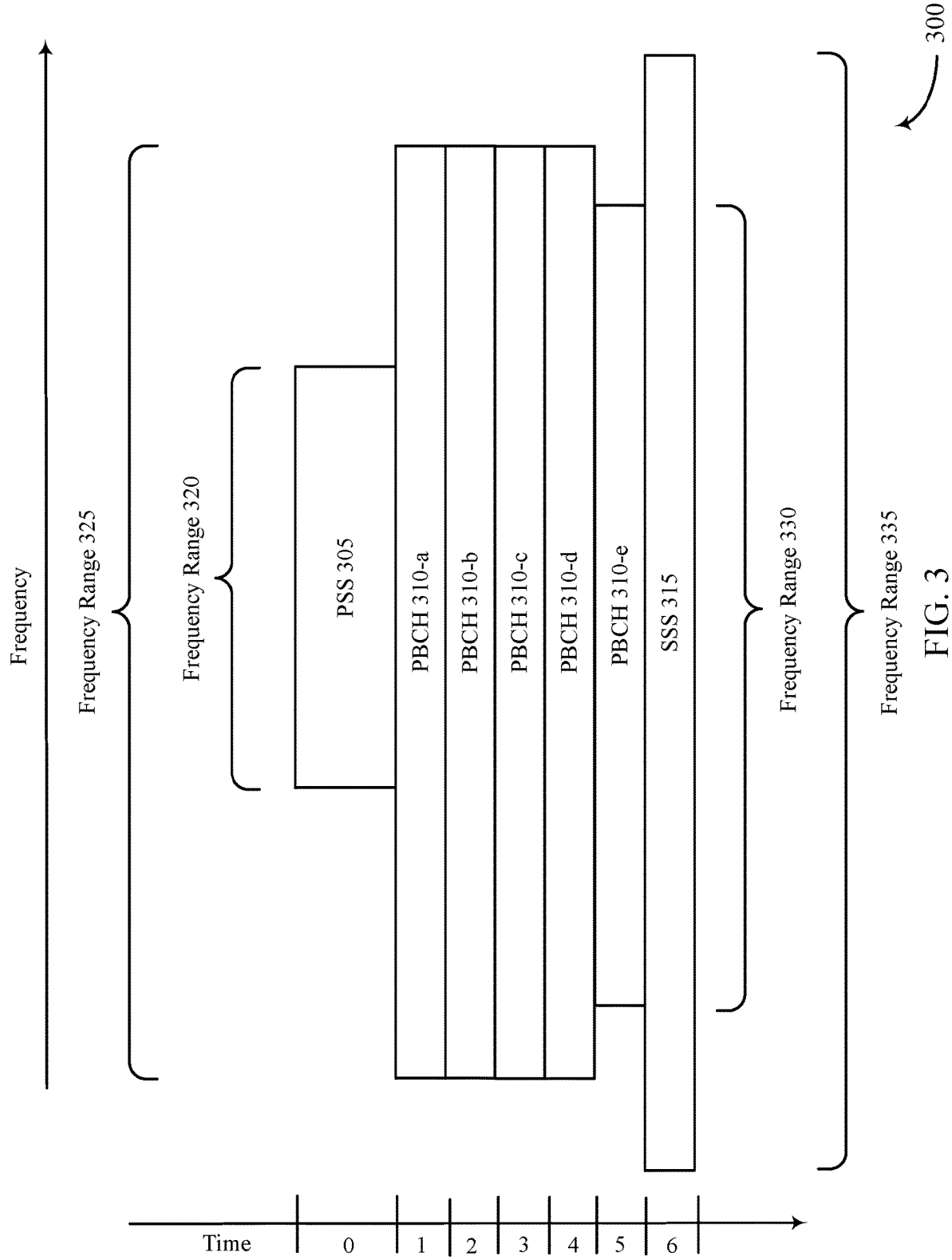
FIG. 3 illustrates an example of an SSB that supports EPRE ratios for SSB symbols in accordance with aspects of the present disclosure.

FIG. 3 illustrates an example of an SSB 300 that supports EPRE ratios for SSB symbols in accordance with aspects of the present disclosure. In some examples, an SSB 300 may implement aspects of wireless communication system 100. A base station 105, which may be an example of corresponding devices described with reference to FIG. 1, may transmit an SSB 300 to a UE 115, which may be an example of corresponding devices described with reference to FIG. 1.

As described with reference to FIG. 2, an SSB 300 may be scaled such that different signals or channels use different SCSs. For instance, an SCS for PSS 305 (e.g., 120 kHz) may be less than an SCS for SSS 315 (e.g., 240 kHz).

SSB 300 may include a PSS 305 located in symbol 0. PSS 305 may span a first frequency range 320 (e.g., 127 subcarriers), and may have a first SCS. SSB 300 may also include PBCH 310-a located in symbol 1, PBCH 310-b located in symbol 2, PBCH 310-c located in symbol 3, PBCH 310-d located in symbol 4, PBCH 310-e located in symbol 5. PBCH 310 may have a larger SCS than PSS 305. For example, PBCH 310 may have an SCS that is double the SCS of PSS 305. PBCH 310 in different symbols may have different bandwidths. For example, PBCH 310-a, PBCH 310-b, PBCH 310-c, and PBCH 310-d may have the same bandwidth, spanning frequency range 325 (e.g., 240 subcarriers). PBCH 310-e may span frequency range 330 (e.g., 192 subcarriers). Because PBCH 310 has a higher SCS than PSS 305, symbols 1 through 5 may have shorter durations than symbol 0. SSB 300 may also include SSS 315 in symbol 6. SSS 315 may span frequency range 335 (e.g., 254 subcarriers). SSS 315 may also have a different SCS than PSS 305. In some examples, SSS 315 may have the same SSS as PBCH 310, and symbol 6 may have the same duration as symbols 1 through 5.

As described with reference to FIG. 2, a UE 115 may search for PSS 305 using a manageable timing complexity, and may obtain coarse timing resolution from PSS 305 due to the symbol duration of symbol 0. Having obtained the coarse timing resolution from PSS 305, UE 115 may be capable of obtaining the finer timing resolution from SSS 315 which has a smaller symbol duration, and may fine tune timing of the UE 115 according to the finer timing resolution from SSS 315.

As described in greater detail with reference to FIG. 5, a UE 115 may identify a bandwidth of a symbol in which PSS 305 is located (e.g., frequency range 320), and a bandwidth of a symbol in which SSS 315 is located (e.g., frequency range 335), which may span 240 subcarriers), a bandwidth of a symbol in which PBCH 210 is located (e.g., frequency range 330, frequency range 335), or a combination thereof. The UE 115 may calculate an EPRE ratio between PSS 305 and either SSS 315 or PBCH 310, or perform a lookup function to identify an EPRE ratio between PSS 305 and either SSS 315 or PBCH 310, based on the identified bandwidths, and based on a radio frequency spectrum band on which the UE 115 is operating.

Figure 4:
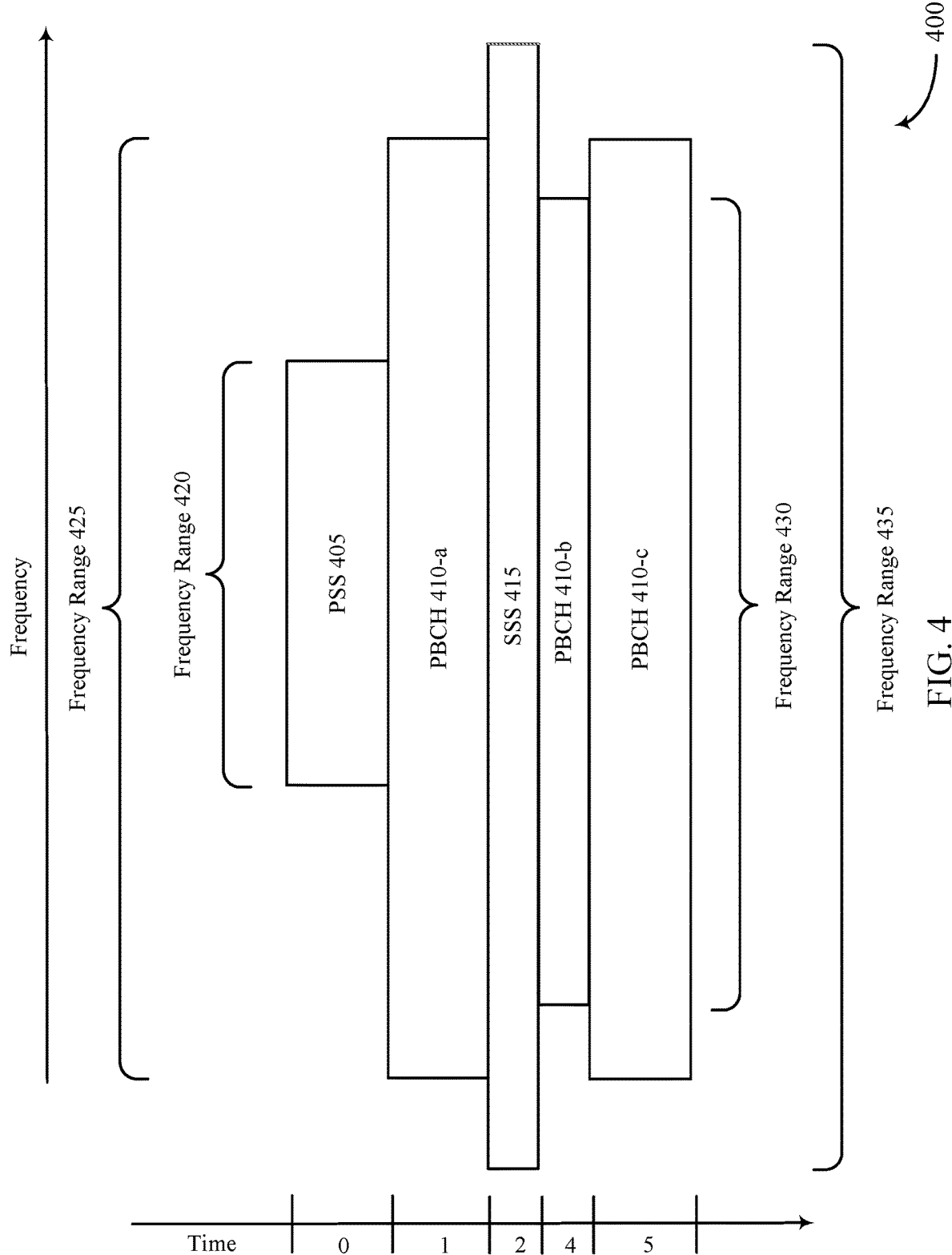
FIG. 4 illustrates an example of an SSB that supports EPRE ratios for SSB symbols in accordance with aspects of the present disclosure.

FIG. 4 illustrates an example of an SSB 400 that supports EPRE ratios for SSB symbols in accordance with aspects of the present disclosure. In some examples, an SSB 400 may implement aspects of wireless communication system 100. A base station 105, which may be an example of corresponding devices described with reference to FIG. 1, may transmit an SSB 400 to a UE 115, which may be an example of corresponding devices described with reference to FIG. 1.

In some examples, different SSB symbols containing PBCHs may have different bandwidths. In such examples, a UE 115 may identify a different EPRE ratio for different PBCH symbols of the SSB.

For example, SSB 400 may include a PSS 405 located in symbol 0. PSS 405 may span frequency range 420 (e.g., 127 subcarriers). PSS 405 may have a first SCS. SSB 400 may also include PBCH 410. Different symbols of SSB 400 may have different bandwidths. For instance, PBCH 410-*a* may span frequency range 425 (e.g., 240 subcarriers), and may be located in symbol 1. PBCH 410-*b* may span frequency range 430 (e.g., 192 subcarriers), and may be located in symbol 4. PBCH 410-*c* may span frequency range 425 (e.g., 240 subcarriers), and may be located in symbol 5. In some examples, PBCH 410 may have different SCSs in different symbols. For example, PBCH 410-*a* and PBCH 410-*c* may have one SCS (e.g., the same SCS as PSS 405). PBCH 410-*b* may have a second SCS (e.g., double the SCS of PSS 405). SSB 400 may also include SSS 415. SSS 415 may span frequency range 435 (e.g., 254 subcarriers), and may be located in symbol 3. SSS 415 may have a second SCS (e.g., the same SCS as PBCH 410-*b*).

As described in greater detail with reference to FIG. 5, UE 115 may identify an EPRE ratio between PSS 405 and PBCH 410-*a*, and a second EPRE ratio between PSS 405 and PBCH 410-*b*. In some examples, UE 115 may not identify a third EPRE ratio between PSS 405 and PBCH 410-*c* (e.g., because PBCH 410-*a* and PBCH 410-*c* have the same bandwidth (e.g., frequency range 420). The two EPRE ratios may be based on respective bandwidths for symbol 0, symbol 1, and symbol 4.

Figure 5:
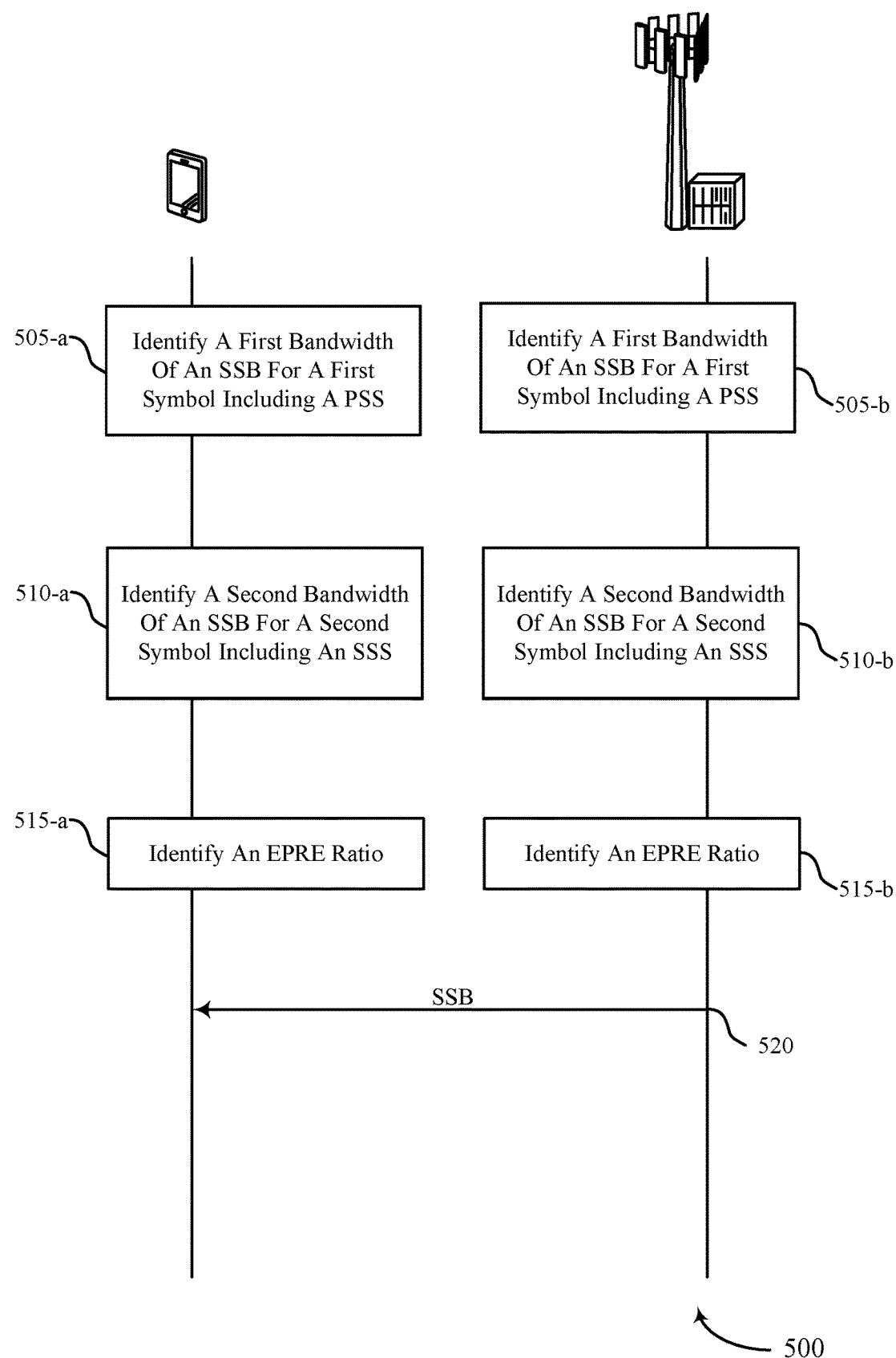
FIG. 5 illustrates an example of a process flow that supports EPRE ratios for SSB symbols in accordance with aspects of the present disclosure.

FIG. 5 illustrates an example of a process flow 500 that supports EPRE ratios for SSB symbols in accordance with aspects of the present disclosure. In some examples, process flow 500 may implement aspects of wireless communication system 100. UE 115-*a* and base station 105-*a* may be examples of corresponding devices described with reference to FIG. 1. A UE 115-*a* may identify an EPRE ratio between a PSS of an SSB and an SSS or PBCH. The EPRE ratio may be based on the bandwidth of the SSB symbol containing the PSS, the bandwidth of the symbol containing the SSS (including any PBCH in that symbol), or the bandwidth of the symbol containing the PBCH (in a PBCH-only symbol of the SSB). The EPRE ratio may further be based on the operating band/frequency of the SSB and any regulatory threshold values for a geographic region for that band. For example, UE 115-*a* may identify the EPRE ratio based on a maximum regulatory EIRP limit (e.g., in dBm) for the band, a maximum regulatory PSD (e.g., in dBM/MHz) for the band, or a combination thereof At 505-*a*, UE 115-*a* may identify a first bandwidth of an SSB for a first symbol including a PSS. Similarly, at 505-*b*, base station 105-*a* may identify the first bandwidth of the SSB for the first symbol including the PSS.

At 510-*a*, UE 115-*a* may identify a second bandwidth of the SSB for a second symbol including an SSS. Similarly, at 510-*b*, base station 105-*a* may identify the second bandwidth of the SSB for the second symbol including the SSS.

At 515-*a*, UE 115-*a* may identify an EPRE ratio. The EPRE ratio may be an EPRE ratio between the PSS and the SSS, or between the PSS and the PBCH. UE 115-*a* may identify the EPRE ratio based on the first bandwidth, the second bandwidth, and a radio frequency spectrum band in which the UE is operating.

In some examples, UE 115-*a* may identify a EIRP for the radio frequency spectrum band, and may identify the EPRE ratio based on the threshold EIRP. The threshold EIRP may be based on a geographic location of UE 115-*a*.

UE 115-*a* may identify a threshold PSD for the radio frequency spectrum band, and may identify the EPRE ratio based on the threshold PSD. In some examples, the threshold PSD for the radio frequency spectrum band may be based on the geographic location of the UE 115-*a*.

In some examples, UE 115-*a* may identify the EPRE ratio between the PSS and SSS or PBCH based on specified, or tabulated, values with some quantization. For example, UE 115-*a* may perform a lookup function and identify the EPRE based on a table. For example, UE 115-*a* may identify an entry in the table, the entry indicating the EPRE ratio. The table may include, in one column, multiple entries indicating the EPRE ratios. Each EPRE ratio may be associated with a combination of values that include a PSS bandwidth and one or more of the SSS bandwidth or a broadcast channel bandwidth. For instance, one column may be associated with the EPRE values, another column with PSS bandwidths, another column with SSS bandwidths, another column with PBCH bandwidths, etc. In some examples, another column may be associated with operating bands. In such examples, UE 115-*a* may identify a row of the table associated with the identified operating bandwidth, PSS bandwidth, and the SSS bandwidth or the PBCH bandwidth, and may identify the EPRE ratio associated with that row. In some examples, the table may provide multiple entries indicating multiple EPRE ratios, and each EPRE ratio associated with a combination of values including the PSS bandwidth, and one or more of the SSS bandwidth or broadcast channel bandwidth. In some examples, the combination of values may also include a first SCS for the PSS, a second SCS for the SSS or broadcast channel.

In some examples, a table may include a reduced number of columns. For example, the table may include one column for various SSB configurations. Each SSB configuration in the column may correspond to a different combination of PSS bandwidths, and SSS bandwidths or PBCH bandwidths, and operating bands, or any combination thereof. The UE 115-a may identify the SSB configuration corresponding to the identified PSS bandwidth, identified SSS bandwidth or PBCH bandwidth, or operating band, and may select the EPRE ratio associated with the identified SSB configuration.

In some examples, UE 115-a may identify the EPRE ratio by calculating one or more unquantized values. For example, UE 115-a may calculate the EPRE ratio between the PSS and the SSS as follow: $EPRE_{PSS}-EPRE_{SSS}=\min(EIRP_{max,i}-10\log_{10}(BW_{PSS}), PSD_{max,i})-\min(EIRP_{max,i}-10\log_{10}(BW_{SSS}), PSD_{max,i})$; or may calculate the EPRE ratio between the PSS and the PBCH as follows: $EPRE_{PSS}-EPRE_{PBCH}=10\log_{10}(BW_{PSS}), PSD_{max,i})-\min(EIRP_{max,i}-10\log_{10}(BW_{PBCH}), PSD_{max,i})$, where $BW_{PSS}$ represents the bandwidth in Mhz of the SSB symbol containing the PSS, $BW_{SSS}$ represents the bandwidth in MHz of the SSB symbol containing the SSS, and where $BW_{PBCH}$ represents the bandwidth in MHz of the SSB symbol containing the PBCH. IN the above described calculations, $EIRP_{max,i}$ represents the regulator EIRP limit in dBm, and $PSD_{max,i}$ represents the maximum PSD in dBM/MHz for a band i. For instance, for a band of 57 to 71 GHz, for U.S. regulatory values, $EIRP_{max,i}$ may be equal to 40 dBm, and $PSD_{max,i}$ may be equal to 23 dBm/MHz. In such examples, for a PSS SCS of 120 kHz, and an SSS SCS of 240 kHz, with a PSS bandwidth of 17.28 MHz and SSS bandwidth of 57.6 MHz, the EPRE ratio $EPRE_{PSS}-EPRE_{SSS}$ may be equal to 0.6 dB. For a PSS SCS of 240 kHz, and an SSS SCS of 240 kHz, with a PSS bandwidth of 34.56 MHz and SSS bandwidth of 57.6 MHz, the EPRE ratio $EPRE_{PSS}-EPRE_{SSS}$ may be equal to 0.6 dB. For a PSS SCS of 120 kHz, and an SSS SCS of 480 kHz, with a PSS bandwidth of 17.28 MHz and SSS bandwidth of 115.2 MHz, the EPRE ratio $EPRE_{PSS}-EPRE_{SSS}$ may be equal to 3.6 dB.

In some examples, UE 115-a may identify EPRE ratios using a combination of specified or tabulated values with some quantization and unquantized values. For example, UE 115-a may determine that the PSS bandwidth, SSS bandwidth or PBCH bandwidth, operating band, or combination thereof, are located within a range of possible values, and may identify an EPRE ratio associated with the identified range of values. In some examples, UE 115-a may calculate an EPRE ratio, and may select a quantized EPRE ratio that is closest two or within a threshold value from the calculated EPRE ratio.

In some examples, UE 115-a may identify a different EPRE ratio for different symbols of the SSB. For example, the SSB may include various PBCHs in varying symbols that have different bandwidths (e.g., as described in greater detail with reference to FIG. 4). In such examples, UE 115-a may identify a first EPRE ratio between a symbol containing the PSS and a first symbol containing a first PBCH, and a second EPRE ratio between the symbol containing the PSS and a second symbol containing a second PBCH, etc. For instance, UE 115-a may identify a first column of the table corresponding to a first EPRE ratio between a symbol containing the PSS and a first symbol containing a first PBCH, and a second column of the table corresponding to a second EPRE ratio between the symbol containing the PSS and a second symbol containing a second PBCH. In some examples UE 115-a may identify a first table for the first EPRE ratio, and a second table for the second EPRE ratio. In some examples, UE 115-a may calculate a first EPRE ratio, and a second EPRE ratio for the different PBCH symbols having different bandwidths.

Similarly, at 515-b, base station 105-a may identify the EPRE ratio as described with reference to 515-a. That is, the base station may perform a lookup function, as described herein, to identify the EPRE ratio from a table, or may calculate the EPRE ratio, or any combination thereof.

At 520, base station 105-a may transmit, and UE 115-a may receive, the SSB according to the identified EPRE ratio.

Figure 6:
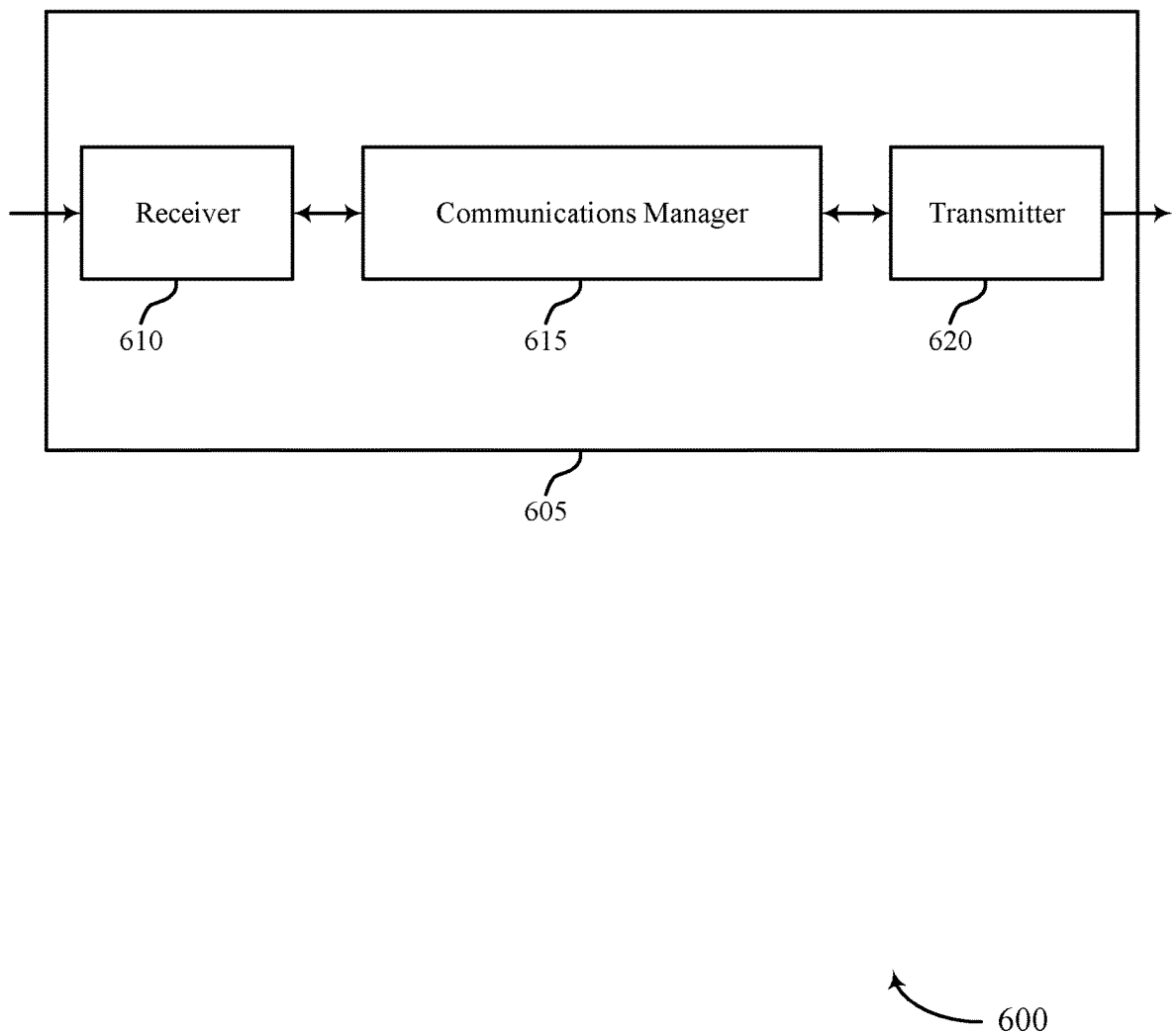
FIGS. 6 and 7 show block diagrams of devices that support EPRE ratios for SSB symbols in accordance with aspects of the present disclosure.

FIG. 6 shows a block diagram 600 of a device 605 that supports EPRE ratios for SSB symbols in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to EPRE ratios for SSB symbols, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a first bandwidth of an SSB for a first symbol that includes a PSS, identify a second bandwidth of the SSB for a second symbol that includes one or more of an SSS or a PBCH, identify, based on the first bandwidth, the second bandwidth, and a radio frequency spectrum band in which the UE is operating, an EPRE ratio between the PSS and the one or more of the SSS or the PBCH, and receive the SSSB according to the identified EPRE ratio. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

By including or configuring the communications manager 615 in accordance with the implementations of the present disclosure, the device 605 (e.g., a processor controlling or otherwise coupled to one or more of the receiver 610, the communications manager 615, or the transmitter 620) may support techniques for improving power efficiency without exceeding regulatory power limits based on identifying an EPRE ratio between an SSB symbol containing a PSS and an SSB containing an SSS, a PBCH, or both. Such techniques may also support receiving (e.g., at the receiver 610) an SSB with reduced interference and improved timing resolution.

Figure 7:
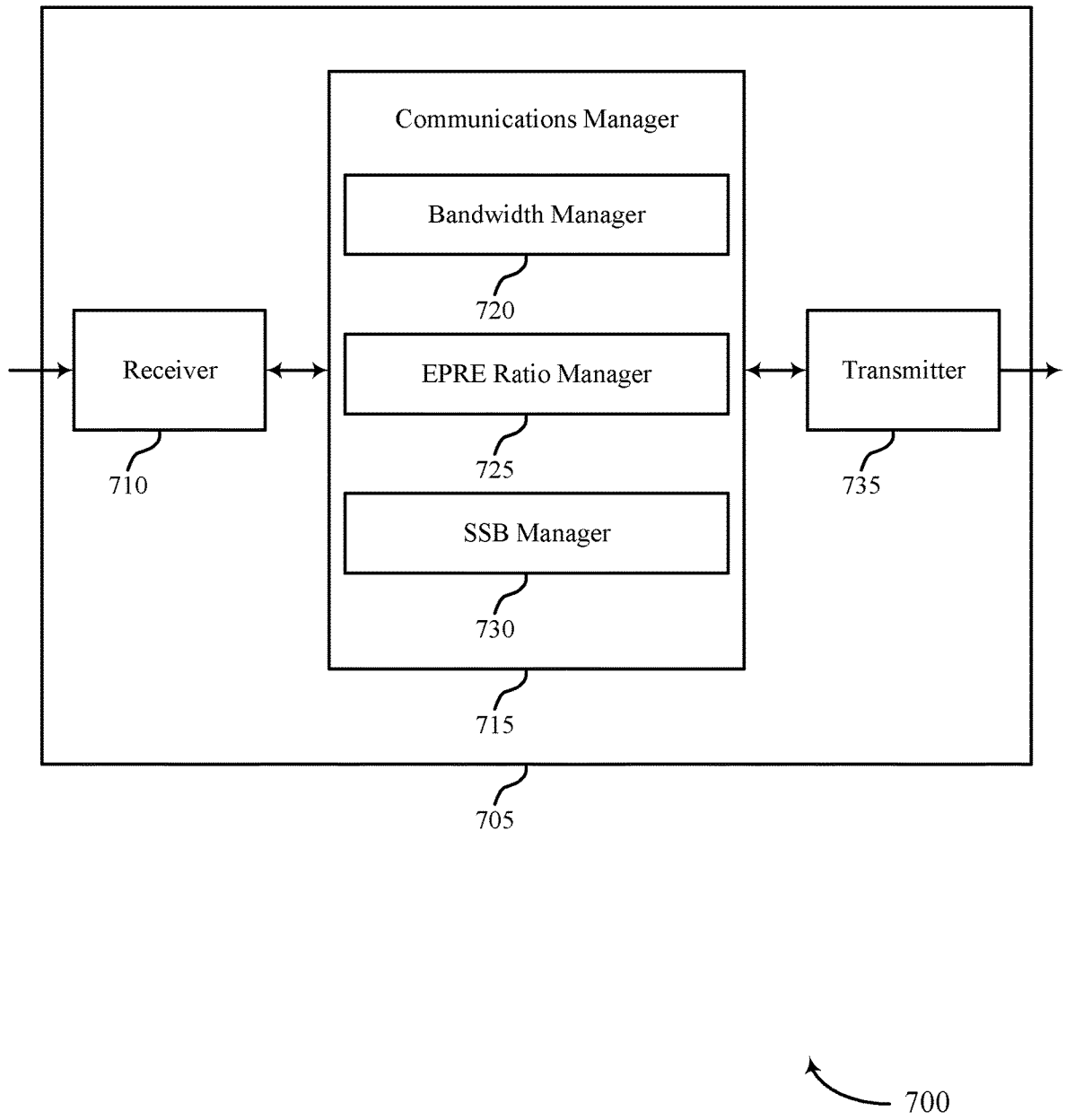

FIG. 7 shows a block diagram 700 of a device 705 that supports EPRE ratios for SSB symbols in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to EPRE ratios for SSB symbols, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a bandwidth manager 720, an EPRE ratio manager 725, and an SSB manager 730. The communications manager 715 may be an example of aspects of the communications manager 910 described herein.

The bandwidth manager 720 may identify a first bandwidth of an SSB for a first symbol that includes a PSS and identify a second bandwidth of the SSB for a second symbol that includes one or more of an SSS or a broadcast channel (e.g., a PBCH).

The EPRE ratio manager 725 may identify, based on the first bandwidth, the second bandwidth, and a radio frequency spectrum band in which the UE is operating, an EPRE ratio between the PSS and the one or more of the SSS or the broadcast channel.

The SSB manager 730 may receive the SSB according to the identified EPRE ratio.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
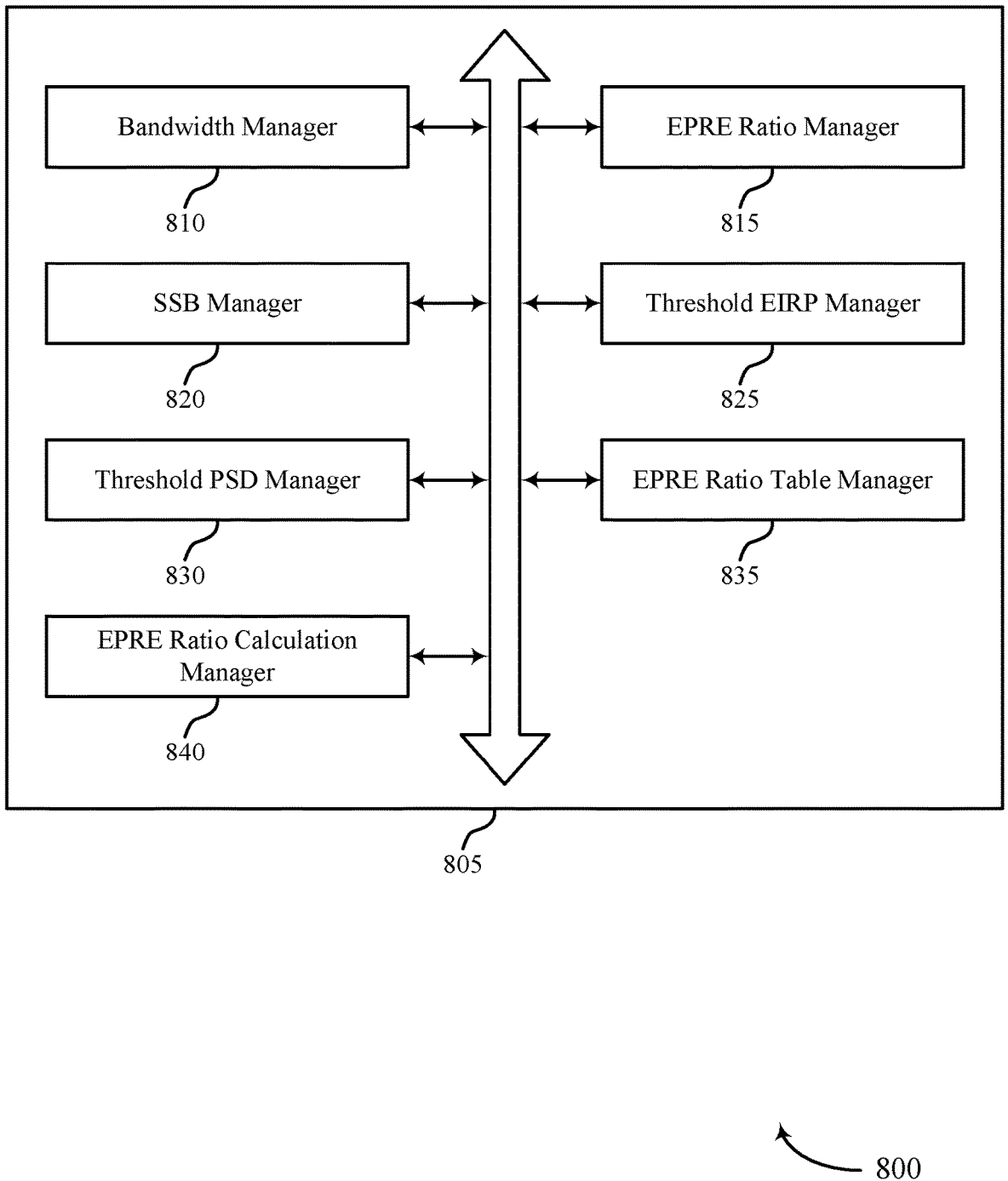
FIG. 8 shows a block diagram of a communications manager that supports EPRE ratios for SSB symbols in accordance with aspects of the present disclosure.

FIG. 8 shows a block diagram 800 of a communications manager 805 that supports EPRE ratios for SSB symbols in accordance with aspects of the present disclosure. The communications manager 805 may be an example of aspects of a communications manager 615, a communications manager 715, or a communications manager 910 described herein. The communications manager 805 may include a bandwidth manager 810, an EPRE ratio manager 815, an SSB manager 820, a threshold EIRP manager 825, a threshold PSD manager 830, an EPRE ratio table manager 835, and an EPRE ratio calculation manager 840. Each of these modules may communicate, directly or indirectly, with one another (e.g., via one or more buses).

The bandwidth manager 810 may identify a first bandwidth of an SSB for a first symbol that includes a PSS. In some examples, the bandwidth manager 810 may identify a second bandwidth of the SSB for a second symbol that includes one or more of an SSS or a broadcast channel.

The EPRE ratio manager 815 may identify, based on the first bandwidth, the second bandwidth, and a radio frequency spectrum band in which the UE is operating, an EPRE ratio between the PSS and the one or more of the SSS or the broadcast channel. In some examples, the EPRE ratio manager 815 may identify a third bandwidth of the SSB for a third symbol that includes one or more of an SSS signal or a second broadcast channel. In some examples, the EPRE ratio manager 815 may identify a second EPRE ratio between the PSS and the one or more of the SSS signal or the second broadcast channel based on the first bandwidth, the third bandwidth, and the radio frequency spectrum band in which the UE is operating, where receiving the SSB is based on the identified second EPRE ratio.

The SSB manager 820 may receive the SSB according to the identified EPRE ratio.

The threshold EIRP manager 825 may identify a threshold EIRP for the radio frequency spectrum band, where identifying the EPRE ratio is based on the threshold EIRP for the radio frequency spectrum band. In some cases, the threshold EIRP for the radio frequency spectrum band is based on a geographic location of the UE.

The threshold PSD manager 830 may identify a threshold PSD for the radio frequency spectrum band, where identifying the EPRE ratio is based on the threshold PSD. In some cases, the threshold PSD for the radio frequency spectrum band is based on a geographic location of the UE.

The EPRE ratio table manager 835 may identify, based on the first bandwidth, the second bandwidth, and the radio frequency spectrum band, an entry in a table, the entry indicating the EPRE ratio. In some cases, the table provides a set of entries indicating a set of EPRE ratios, each EPRE ratio associated with a combination of values that includes a PSS bandwidth and one or more of an SSS bandwidth or a broadcast channel bandwidth. In some cases, the combination of values further includes a first SCS for the PSS and a second SCS for the one or more of the SSS or the broadcast channel. In some cases, the table provides a set of entries indicating a set of EPRE ratios, each EPRE ratio associated with an SSB configuration.

The EPRE ratio calculation manager 840 may calculate the EPRE ratio based on the first bandwidth, the second bandwidth, and the radio frequency spectrum band in which the UE is operating.

Figure 9:
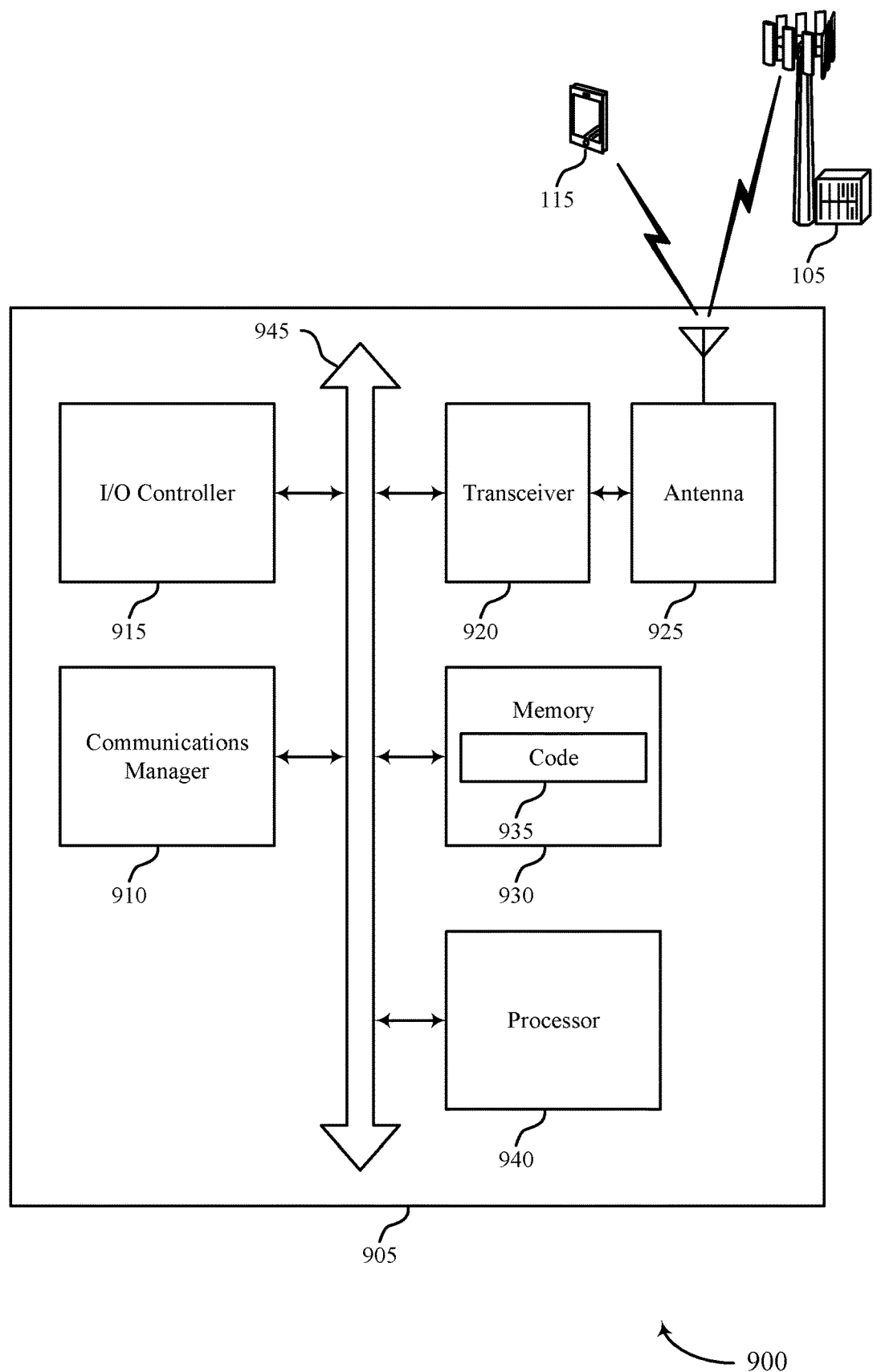
FIG. 9 shows a diagram of a system including a device that supports EPRE ratios for SSB symbols in accordance with aspects of the present disclosure.

FIG. 9 shows a diagram of a system 900 including a device 905 that supports EPRE ratios for SSB symbols in accordance with aspects of the present disclosure. The device 905 may be an example of or include the components of device 605, device 705, or a UE 115 as described herein.

The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a first bandwidth of an SSB for a first symbol that includes a PSS, identify a second bandwidth of the SSB for a second symbol that includes one or more of an SSS or a broadcast channel, identify, based on the first bandwidth, the second bandwidth, and a radio frequency spectrum band in which the UE is operating, an EPRE ratio between the PSS and the one or more of the SSS or the broadcast channel, and receive the SSB according to the identified EPRE ratio.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting EPRE ratios for SSB symbols).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
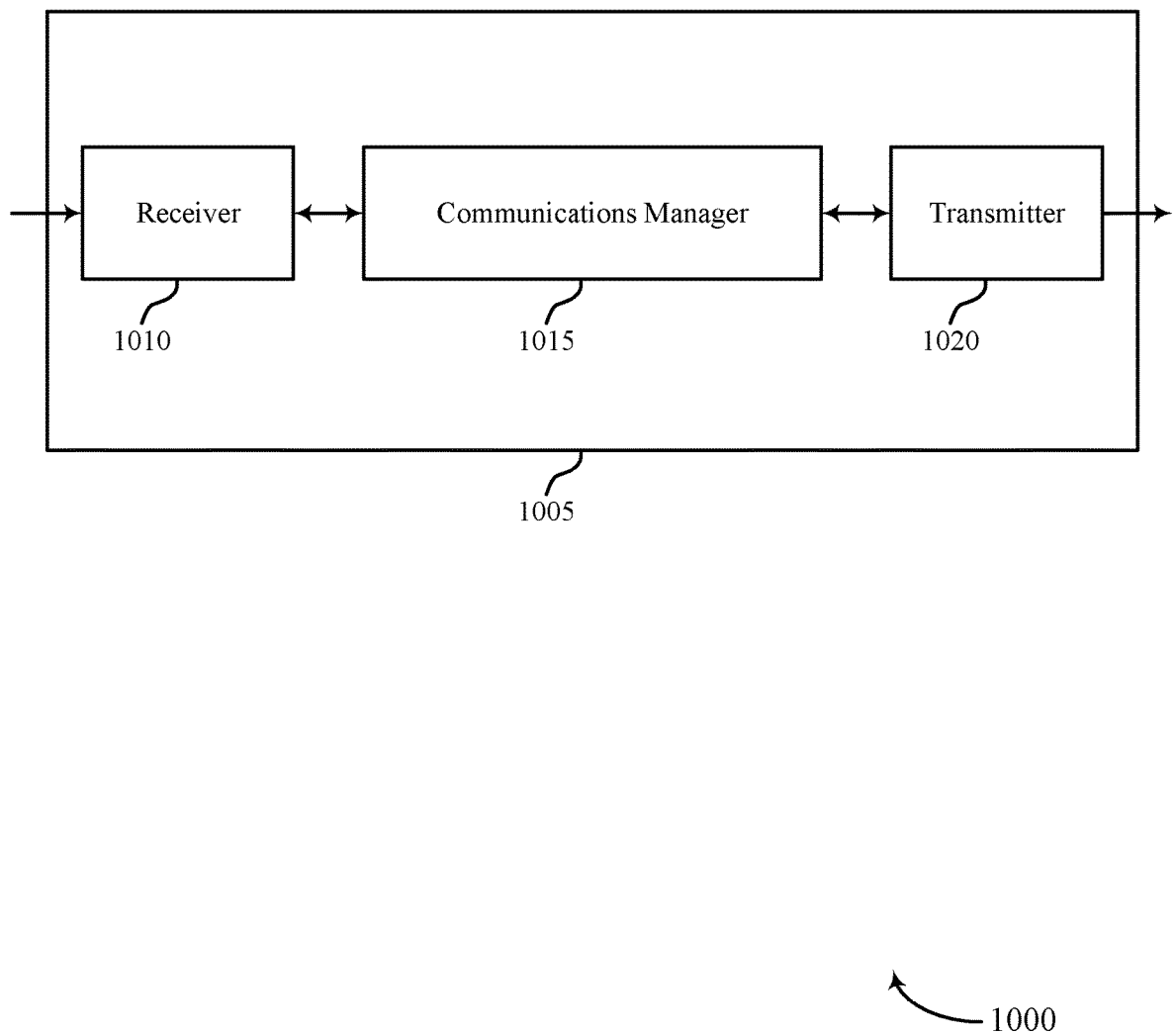
FIGS. 10 and 11 show block diagrams of devices that support EPRE ratios for SSB symbols in accordance with aspects of the present disclosure.

FIG. 10 shows a block diagram 1000 of a device 1005 that supports EPRE ratios for SSB symbols in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to EPRE ratios for SSB symbols, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a first bandwidth of an SSB for a first symbol that includes a PSS, identify a second bandwidth of the SSB for a second symbol that includes one or more of an SSS or a broadcast channel (e.g., a PBCH), identify, based on the first bandwidth, the second bandwidth, and a radio frequency spectrum band in which the UE is operating, an EPRE ratio between the PSS and the one or more of the SSS or the broadcast channel, and transmit the SSB according to the identified EPRE ratio. The communications manager 1015 may be an example of aspects of the communications manager 1310 described herein. The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

By including or configuring the communications manager 1015 in accordance with implementations of the present disclosure, the device 1005 (e.g., a processor controlling or otherwise coupled to one or more of the receiver 1010, the communications manager 1015, or the transmitter 1020) may support techniques for improving power efficiency without exceeding regulatory power limits based on identifying an EPRE ratio between an SSB symbol containing a PSS and an SSB containing an SSS, a PBCH, or both. Such techniques may also support transmitting (e.g., at the transmitter 1020) an SSB with reduced interference and improved timing resolution.

Figure 11:
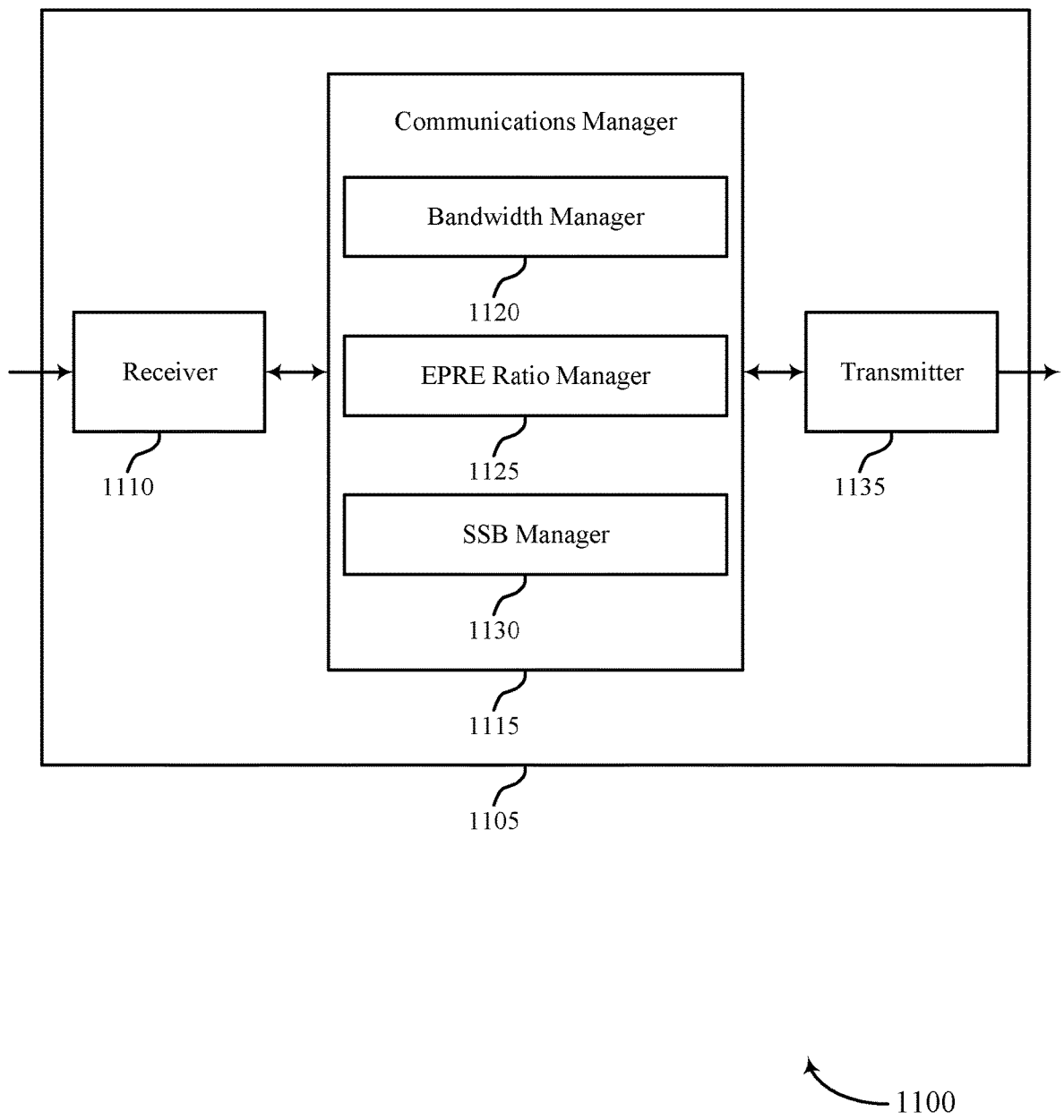

FIG. 11 shows a block diagram 1100 of a device 1105 that supports EPRE ratios for SSB symbols in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to EPRE ratios for synchronization SSBs, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a bandwidth manager 1120, an EPRE ratio manager 1125, and an SSB manager 1130. The communications manager 1115 may be an example of aspects of the communications manager 1310 described herein.

The bandwidth manager 1120 may identify a first bandwidth of an SSB for a first symbol that includes a PSS and identify a second bandwidth of the SSB for a second symbol that includes one or more of an SSS or a broadcast channel.

The EPRE ratio manager 1125 may identify, based on the first bandwidth, the second bandwidth, and a radio frequency spectrum band in which the UE is operating, an EPRE ratio between the PSS and the one or more of the SSS or the broadcast channel.

The SSB manager 1130 may transmit the SSB according to the identified EPRE ratio.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
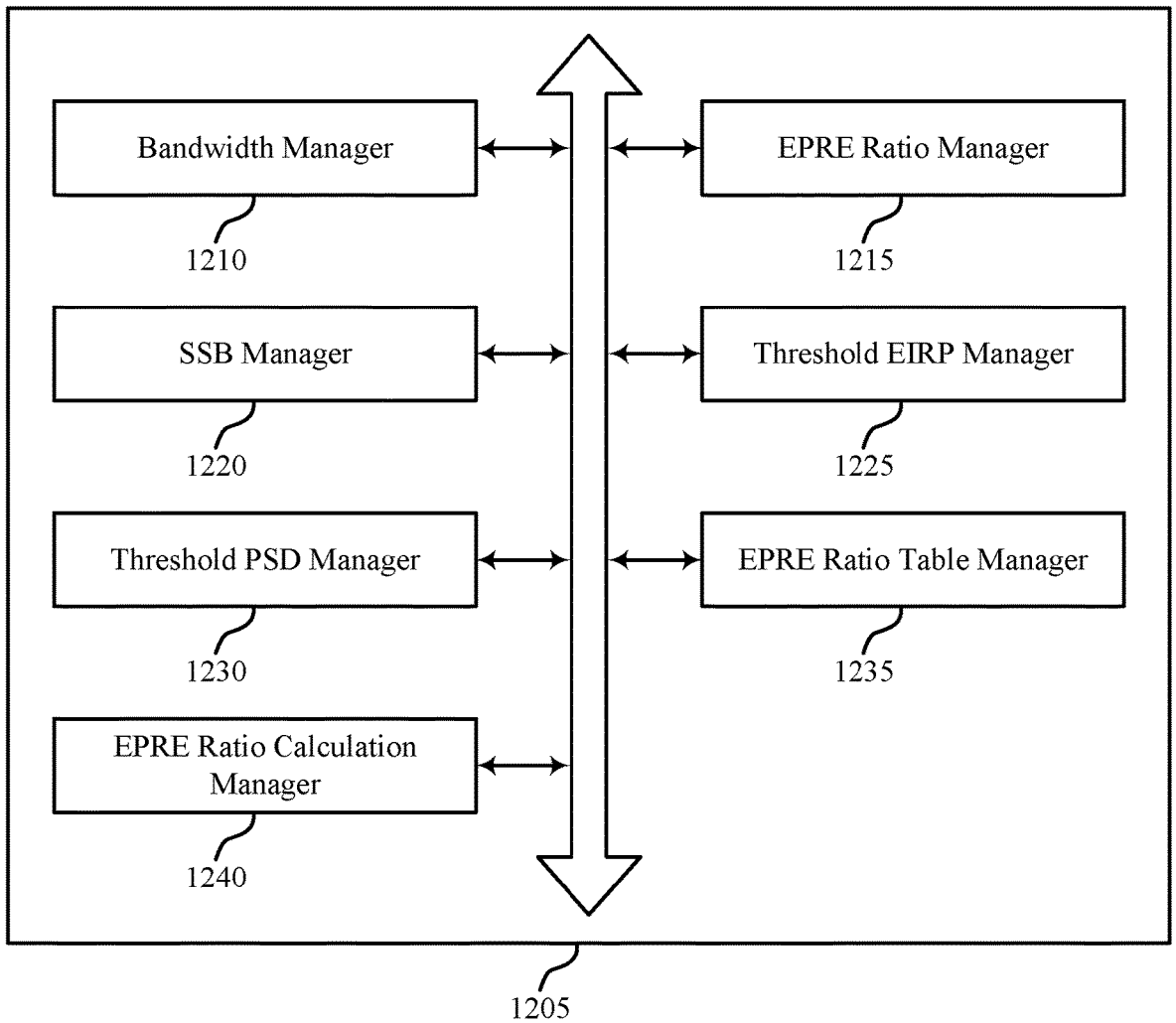
FIG. 12 shows a block diagram of a communications manager that supports EPRE ratios for SSB symbols in accordance with aspects of the present disclosure.

FIG. 12 shows a block diagram 1200 of a communications manager 1205 that supports EPRE ratios for SSB symbols in accordance with aspects of the present disclosure. The communications manager 1205 may be an example of aspects of a communications manager 1015, a communications manager 1115, or a communications manager 1310 described herein. The communications manager 1205 may include a bandwidth manager 1210, an EPRE ratio manager 1215, an SSB manager 1220, a threshold EIRP manager 1225, a threshold PSD manager 1230, an EPRE ratio table manager 1235, and an EPRE ratio calculation manager 1240. Each of these modules may communicate, directly or indirectly, with one another (e.g., via one or more buses).

The bandwidth manager 1210 may identify a first bandwidth of an SSB for a first symbol that includes a PSS. In some examples, the bandwidth manager 1210 may identify a second bandwidth of the SSB for a second symbol that includes one or more of an SSS or a broadcast channel.

The EPRE ratio manager 1215 may identify, based on the first bandwidth, the second bandwidth, and a radio frequency spectrum band in which the UE is operating, an EPRE ratio between the PSS and the one or more of the SSS or the broadcast channel. In some examples, the EPRE ratio manager 1215 may identify a third bandwidth of the SSB for a third symbol that includes one or more of a second SSS or a second broadcast channel. In some examples, the EPRE ratio manager 1215 may identify a second EPRE ratio between the PSS and the one or more of the second SSS or the second broadcast channel based on the first bandwidth, the third bandwidth, and the radio frequency spectrum band in which the UE is operating, where transmitting the SSB is based on the identified second EPRE ratio.

The SSB manager 1220 may transmit the SSB according to the identified EPRE ratio.

The threshold EIRP manager 1225 may identify a threshold EIRP for the radio frequency spectrum band, where identifying the EPRE ratio is based on the threshold EIRP for the radio frequency spectrum band. In some cases, the threshold EIRP for the radio frequency spectrum band is based on a geographic location of the UE.

The threshold PSD manager 1230 may identify a threshold PSD for the radio frequency spectrum band, where identifying the EPRE is based on the threshold PSD. In some cases, the threshold PSD for the radio frequency spectrum band is based on a geographic location of the UE.

The EPRE ratio table manager 1235 may identify, based on the first bandwidth, the second bandwidth, and the radio frequency spectrum band, an entry in a table, the entry indicating the EPRE ratio. In some cases, the table provides a set of entries indicating a set of EPRE ratios, each EPRE ratio associated with a combination of values that includes a PSS bandwidth and one or more of an SSS bandwidth or a broadcast channel bandwidth. In some cases, the combination of values further includes a first SCS for the PSS and a second SCS for the one or more of the SSS bandwidth or the broadcast channel bandwidth. In some cases, the table provides a set of entries indicating a set of EPRE ratios, each EPRE ratio associated with an SSB configuration.

The EPRE ratio calculation manager 1240 may calculate the EPRE ratio based on the first bandwidth, the second bandwidth, and the radio frequency spectrum band in which the UE is operating.

Figure 13:
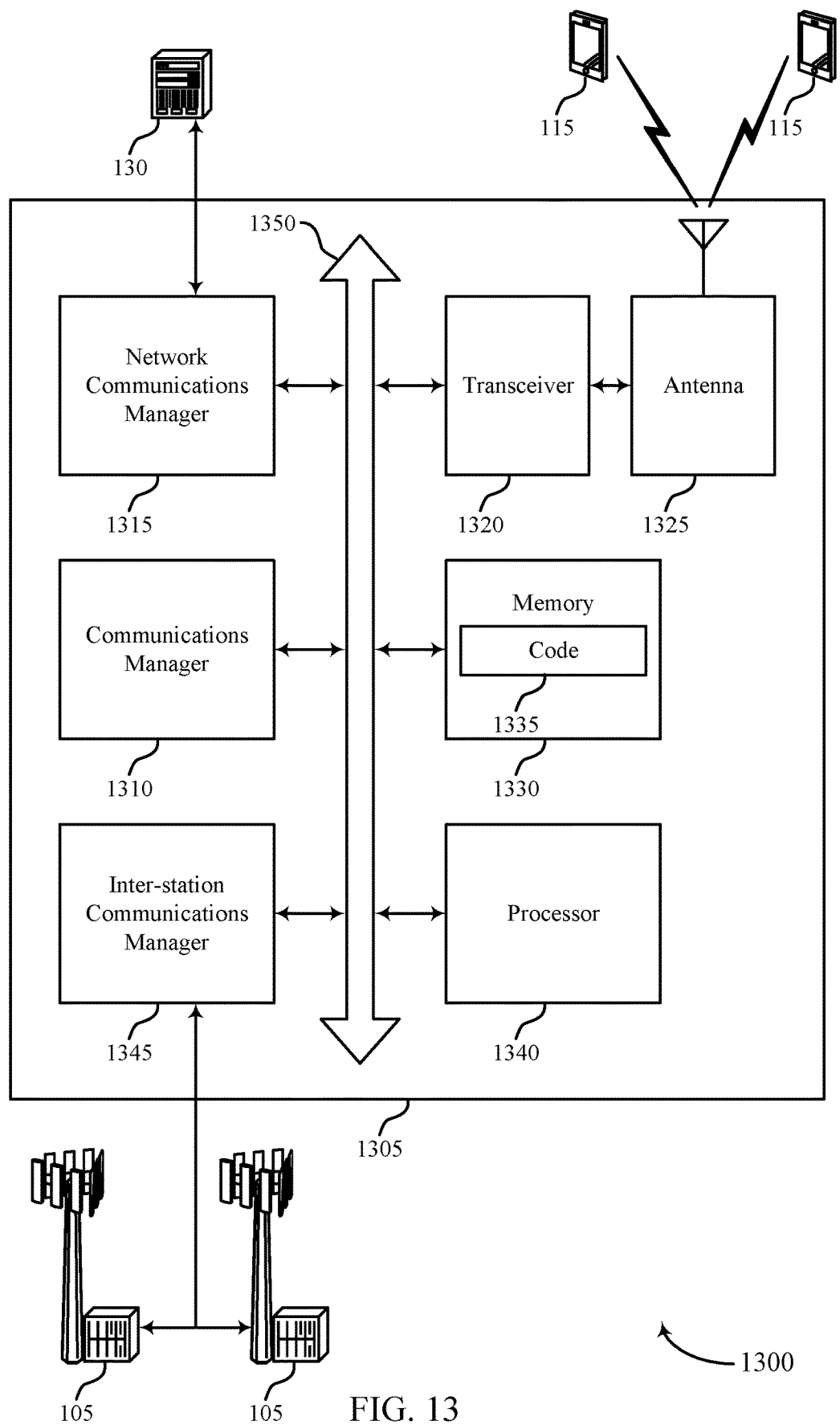
FIG. 13 shows a diagram of a system including a device that supports EPRE ratios for SSB symbols in accordance with aspects of the present disclosure.

FIG. 13 shows a diagram of a system 1300 including a device 1305 that supports EPRE ratios for SSB symbols in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a first bandwidth of an SSB for a first symbol that includes a PSS, identify a second bandwidth of the SSB for a second symbol that includes one or more of an SSS or a broadcast channel, identify, based on the first bandwidth, the second bandwidth, and a radio frequency spectrum band in which the UE is operating, an EPRE ratio between the PSS and the one or more of the SSS or the broadcast channel, and transmit the SSB according to the identified EPRE ratio.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting energy per resource element ratios for synchronization signal block symbols).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
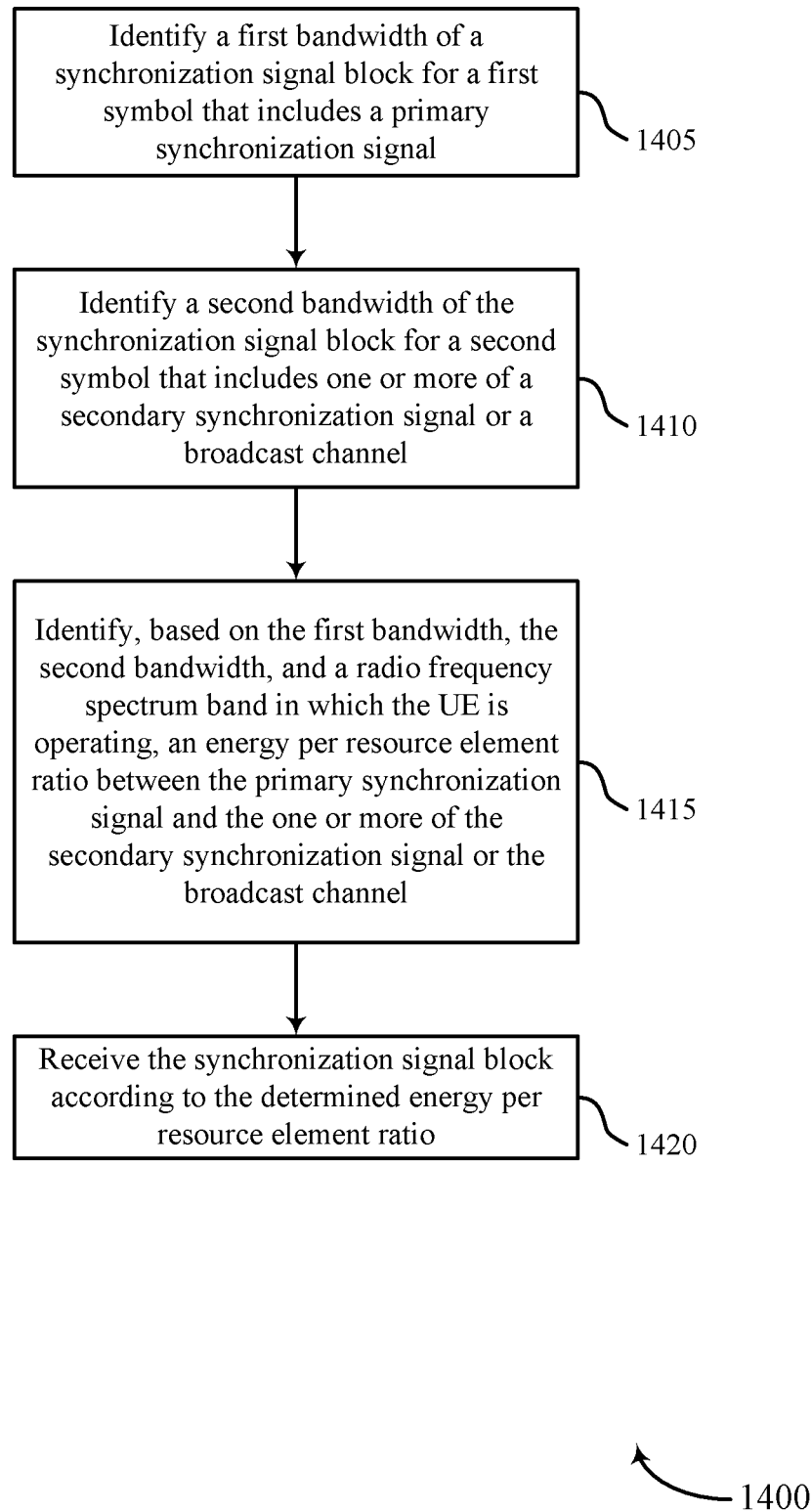
FIGS. 14 through 17 show flowcharts illustrating methods that support EPRE ratios for SSB symbols in accordance with aspects of the present disclosure.

FIG. 14 shows a flowchart illustrating a method 1400 that supports EPRE ratios for SSB symbols in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a first bandwidth of an SSB for a first symbol that includes a PSS. The operations of 1405 may be performed according to the methods described herein. In some examples, aspects of the operations of 1405 may be performed by a bandwidth manager as described with reference to FIGS. 6 through 9.

At 1410, the UE may identify a second bandwidth of the SSB for a second symbol that includes one or more of an SSS or a broadcast channel. The operations of 1410 may be performed according to the methods described herein. In some examples, aspects of the operations of 1410 may be performed by a bandwidth manager as described with reference to FIGS. 6 through 9.

At 1415, the UE may identify, based on the first bandwidth, the second bandwidth, and a radio frequency spectrum band in which the UE is operating, an EPRE ratio between the PSS and the one or more of the SSS or the broadcast channel. The operations of 1415 may be performed according to the methods described herein. In some examples, aspects of the operations of 1415 may be performed by an EPRE ratio manager as described with reference to FIGS. 6 through 9.

At 1420, the UE may receive the SSB according to the identified EPRE ratio. The operations of 1420 may be performed according to the methods described herein. In some examples, aspects of the operations of 1420 may be performed by an SSB manager as described with reference to FIGS. 6 through 9.

Figure 15:
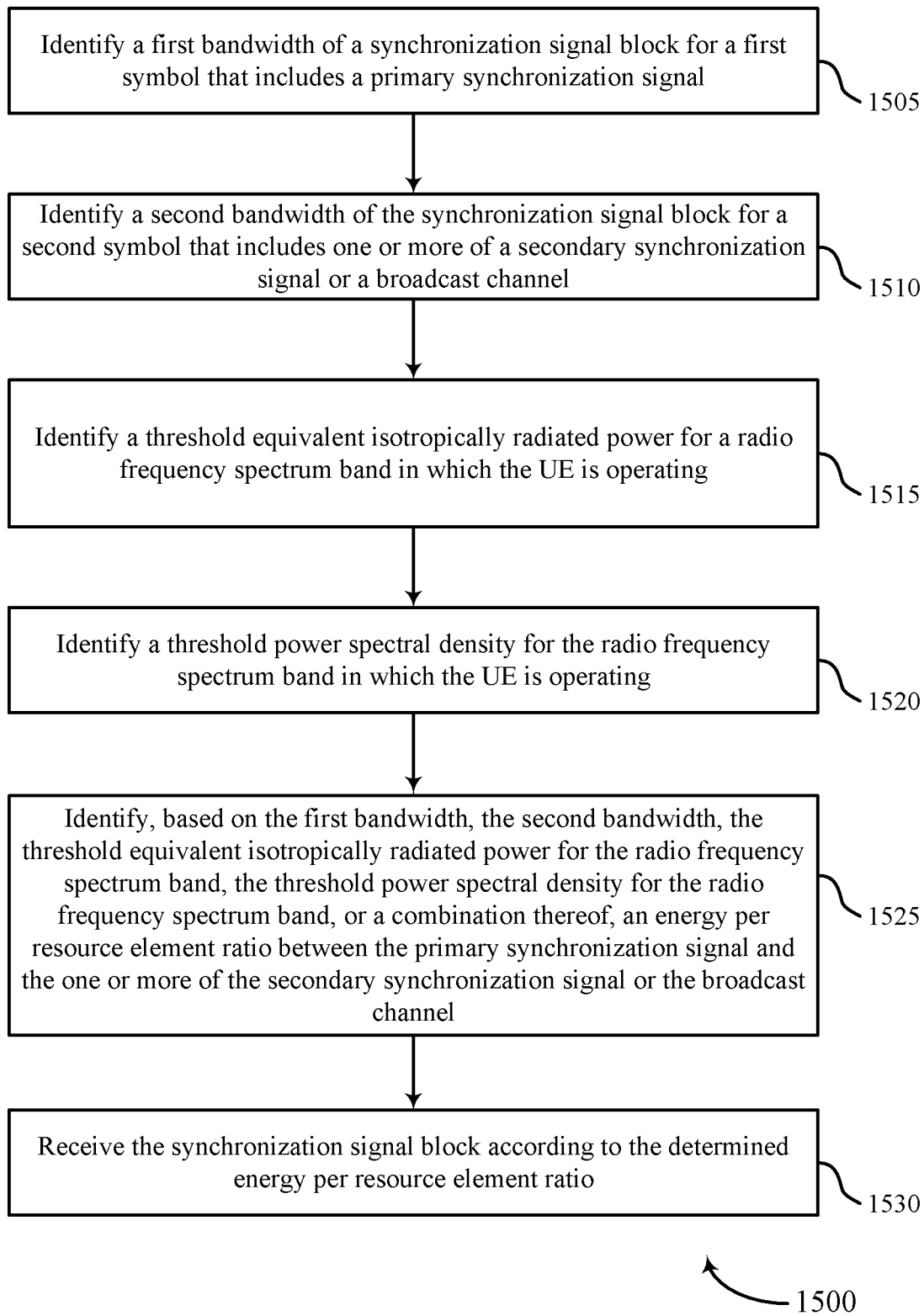

FIG. 15 shows a flowchart illustrating a method 1500 that supports EPRE ratios for SSB symbols in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a first bandwidth of an SSB for a first symbol that includes a PSS. The operations of 1505 may be performed according to the methods described herein. In some examples, aspects of the operations of 1505 may be performed by a bandwidth manager as described with reference to FIGS. 6 through 9.

At 1510, the UE may identify a second bandwidth of the SSB for a second symbol that includes one or more of an SSS or a broadcast channel (e.g., a PBCH). The operations of 1510 may be performed according to the methods described herein. In some examples, aspects of the operations of 1510 may be performed by a bandwidth manager as described with reference to FIGS. 6 through 9.

At 1515, the UE may identify a threshold EIRP for a radio frequency spectrum band in which the UE is operating. The operations of 1515 may be performed according to the methods described herein. In some examples, aspects of the operations of 1515 may be performed by a threshold EIRP manager as described with reference to FIGS. 6 through 9.

At 1520, the UE may identify a threshold PSD for the radio frequency spectrum band in which the UE is operating. The operations of 1520 may be performed according to the methods described herein. In some examples, aspects of the operations of 1520 may be performed by a threshold PSD manager as described with reference to FIGS. 6 through 9.

At 1525, the UE may identify, based on the first bandwidth, the second bandwidth, the threshold EIRP for the radio frequency spectrum band, the threshold PSD for the radio frequency spectrum band, or a combination thereof, an EPRE ratio between the PSS and the one or more of the SSS or the broadcast channel. The operations of 1525 may be performed according to the methods described herein. In some examples, aspects of the operations of 1525 may be performed by an EPRE ratio manager as described with reference to FIGS. 6 through 9.

At 1530, the UE may receive the SSB according to the identified EPRE ratio. The operations of 1530 may be performed according to the methods described herein. In some examples, aspects of the operations of 1530 may be performed by an SSB manager as described with reference to FIGS. 6 through 9.

Figure 16:
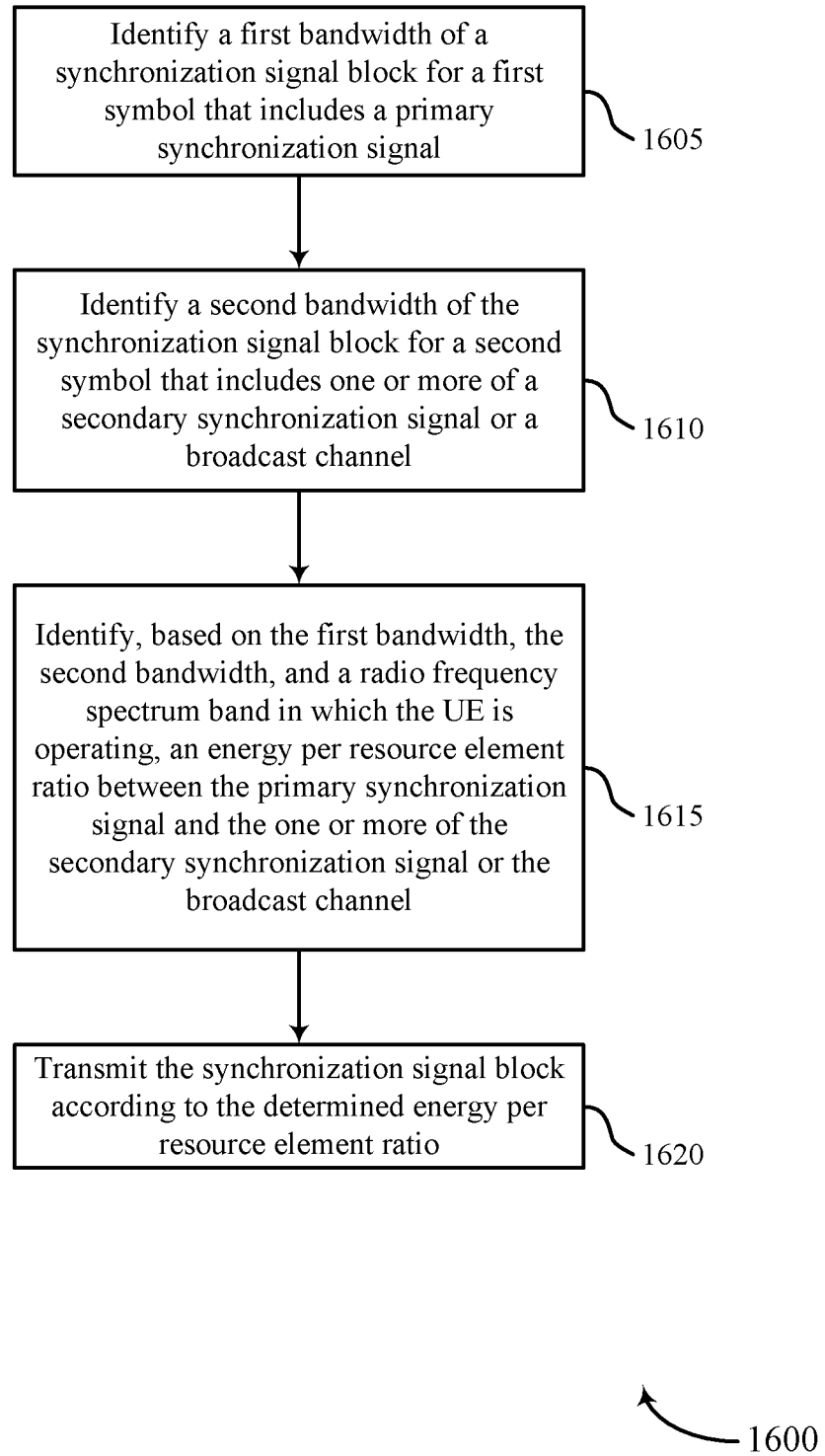

FIG. 16 shows a flowchart illustrating a method 1600 that supports EPRE ratios for SSB symbols in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1605, the base station may identify a first bandwidth of an SSB for a first symbol that includes a PSS. The operations of 1605 may be performed according to the methods described herein. In some examples, aspects of the operations of 1605 may be performed by a bandwidth manager as described with reference to FIGS. 10 through 13.

At 1610, the base station may identify a second bandwidth of the SSB for a second symbol that includes one or more of an SSS or a broadcast channel. The operations of 1610 may be performed according to the methods described herein. In some examples, aspects of the operations of 1610 may be performed by a bandwidth manager as described with reference to FIGS. 10 through 13.

At 1615, the base station may identify, based on the first bandwidth, the second bandwidth, and a radio frequency spectrum band in which the UE is operating, an EPRE ratio between the PSS and the one or more of the SSS or the broadcast channel. The operations of 1615 may be performed according to the methods described herein. In some examples, aspects of the operations of 1615 may be performed by an EPRE ratio manager as described with reference to FIGS. 10 through 13.

At 1620, the base station may transmit the SSB according to the identified EPRE ratio. The operations of 1620 may be performed according to the methods described herein. In some examples, aspects of the operations of 1620 may be performed by an SSB manager as described with reference to FIGS. 10 through 13.

Figure 17:
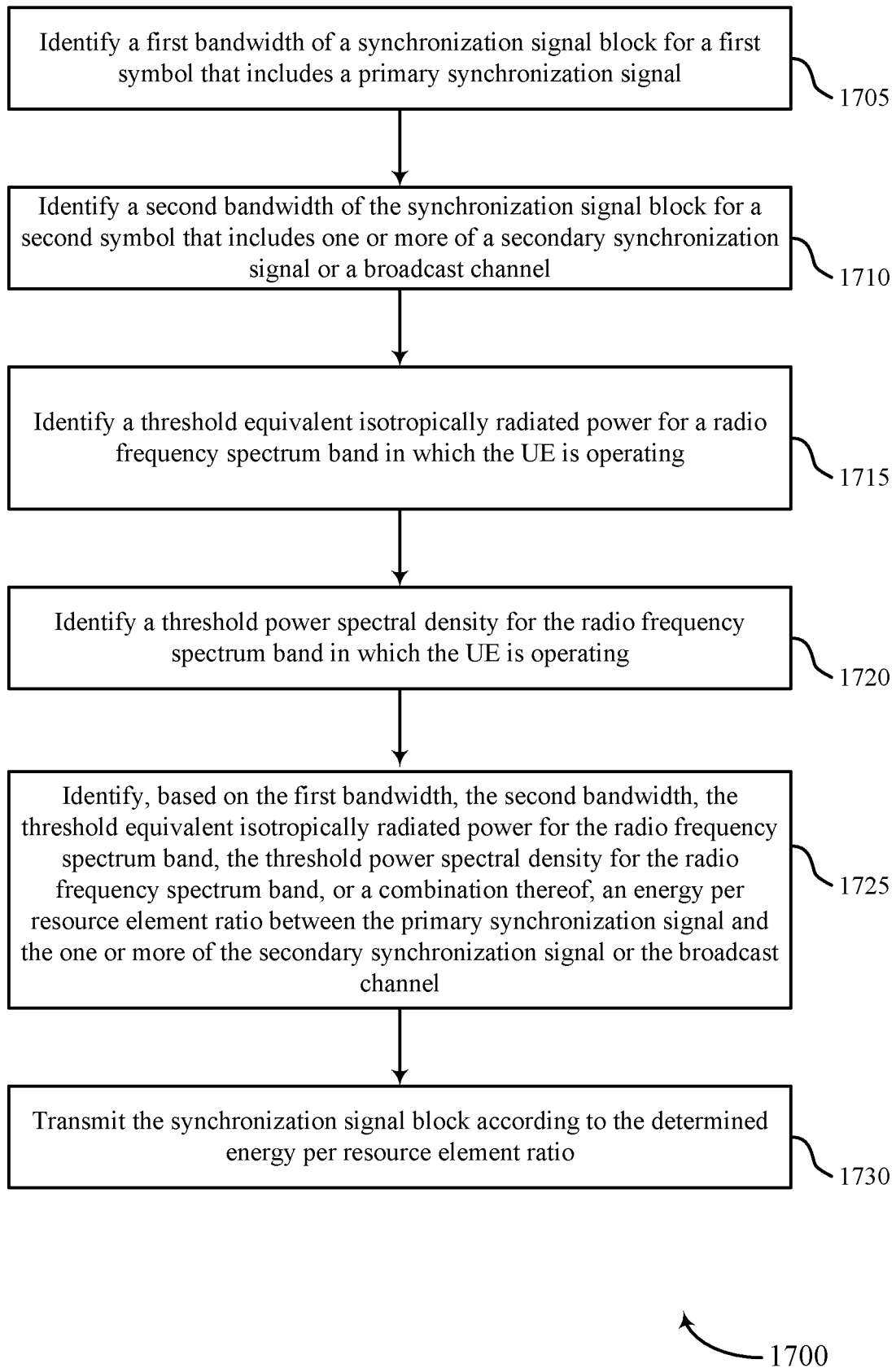

FIG. 17 shows a flowchart illustrating a method 1700 that supports EPRE ratios for SSB symbols in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1705, the base station may identify a first bandwidth of an SSB for a first symbol that includes a PSS. The operations of 1705 may be performed according to the methods described herein. In some examples, aspects of the operations of 1705 may be performed by a bandwidth manager as described with reference to FIGS. 10 through 13.

At 1710, the base station may identify a second bandwidth of the SSB for a second symbol that includes one or more of an SSS or a broadcast channel. The operations of 1710 may be performed according to the methods described herein. In some examples, aspects of the operations of 1710 may be performed by a bandwidth manager as described with reference to FIGS. 10 through 13.

At 1715, the base station may identify a threshold EIRP for a radio frequency spectrum band in which the UE is operating. The operations of 1715 may be performed according to the methods described herein. In some examples, aspects of the operations of 1715 may be performed by a threshold EIRP manager as described with reference to FIGS. 10 through 13.

At 1720, the base station may identify a threshold PSD for the radio frequency spectrum band in which the UE is operating. The operations of 1720 may be performed according to the methods described herein. In some examples, aspects of the operations of 1720 may be performed by a threshold PSD manager as described with reference to FIGS. 10 through 13.

At 1725, the base station may identify, based on the first bandwidth, the second bandwidth, the threshold EIRP for the radio frequency spectrum band, the threshold PSD for the radio frequency spectrum band, or a combination thereof, an EPRE ratio between the PSS and the one or more of the SSS or the broadcast channel. The operations of 1725 may be performed according to the methods described herein. In some examples, aspects of the operations of 1725 may be performed by an EPRE ratio manager as described with reference to FIGS. 10 through 13.

At 1730, the base station may transmit the SSB according to the identified EPRE ratio. The operations of 1730 may be performed according to the methods described herein. In some examples, aspects of the operations of 1730 may be performed by an SSB manager as described with reference to FIGS. 10 through 13.

The following provides an overview of aspects of the present disclosure:

Aspect 1: A method for wireless communications at a UE, comprising: identifying a first bandwidth of an SSB for a first symbol that includes a PSS; identifying a second bandwidth of the SSB for a second symbol that includes one or more of an SSS or a broadcast channel; identifying, based at least in part on the first bandwidth, the second bandwidth, and a radio frequency spectrum band in which the UE is operating, an EPRE ratio between the PSS and the one or more of the SSS or the broadcast channel; and receiving the SSB according to the identified EPRE ratio.

Aspect 2: The method of aspect 1, further comprising: identifying a threshold EIRP for the radio frequency spectrum band, wherein identifying the EPRE ratio is based at least in part on the threshold EIRP for the radio frequency spectrum band.

Aspect 3: The method of aspect 2, wherein the threshold EIRP for the radio frequency spectrum band is based at least in part on a geographic location of the UE.

Aspect 4: The method of any of aspects 1 through 3, further comprising: identifying a threshold PSD for the radio frequency spectrum band, wherein identifying the EPRE ratio is based at least in part on the threshold PSD.

Aspect 5: The method of aspect 4, wherein the threshold PSD for the radio frequency spectrum band is based at least in part on a geographic location of the UE.

Aspect 6: The method of any of aspects 1 through 5, wherein identifying the EPRE ratio between the PSS and the one or more of the SSS or the broadcast channel comprises: identifying, based at least in part on the first bandwidth, the second bandwidth, and the radio frequency spectrum band, an entry in a table, the entry indicating the EPRE ratio.

Aspect 7: The method of aspect 6, wherein the table provides a plurality of entries indicating a plurality of EPRE ratios, each EPRE ratio associated with a combination of values that includes a PSS bandwidth and one or more of an SSS bandwidth or a broadcast channel bandwidth.

Aspect 8: The method of aspect 7, wherein the combination of values further includes a first SCS for the PSS and a second SCS for the one or more of the SSS or the broadcast channel.

Aspect 9: The method of any of aspects 6 through 8, wherein the table provides a plurality of entries indicating a plurality of EPRE ratios, each EPRE ratio associated with an SSB configuration.

Aspect 10: The method of any of aspects 1 through 9, wherein identifying the EPRE ratio between the PSS and the one or more of the SSS or the broadcast channel comprises: calculating the EPRE ratio based at least in part on the first bandwidth, the second bandwidth, and the radio frequency spectrum band in which the UE is operating.

Aspect 11: The method of any of aspects 1 through 10, further comprising: identifying a third bandwidth of the SSB for a third symbol that includes one or more of a second SSS or a second broadcast channel; and identifying a second EPRE ratio between the PSS and the one or more of the second SSS or the second broadcast channel based at least in part on the first bandwidth, the third bandwidth, and the radio frequency spectrum band in which the UE is operating, wherein receiving the SSB is based at least in part on the identified second EPRE ratio.

Aspect 12: A method for wireless communications at a base station, comprising: identifying a first bandwidth of an SSB for a first symbol that includes a PSS; identifying a second bandwidth of the SSB for a second symbol that includes one or more of an SSS or a broadcast channel; identifying, based at least in part on the first bandwidth, the second bandwidth, and a radio frequency spectrum band in which the UE is operating, an EPRE ratio between the PSS and the one or more of the SSS or the broadcast channel; and transmitting the SSB according to the identified EPRE ratio.

Aspect 13: The method of aspect 12, further comprising: identifying a threshold EIRP for the radio frequency spectrum band, wherein identifying the EPRE ratio is based at least in part on the threshold EIRP for the radio frequency spectrum band.

Aspect 14: The method of aspect 13, wherein the threshold EIRP for the radio frequency spectrum band is based at least in part on a geographic location of the UE.

Aspect 15: The method of any of aspects 12 through 14, further comprising: identifying a threshold PSD for the radio frequency spectrum band, wherein identifying the EPRE ratio is based at least in part on the threshold PSD.

Aspect 16: The method of aspect 15, wherein the threshold PSD for the radio frequency spectrum band is based at least in part on a geographic location of the UE.

Aspect 17: The method of any of aspects 12 through 16, wherein identifying the EPRE ratio between the PSS and the one or more of the SSS or the broadcast channel comprises: identifying, based at least in part on the first bandwidth, the second bandwidth, and the radio frequency spectrum band, an entry in a table, the entry indicating the EPRE ratio.

Aspect 18: The method of aspect 17, wherein the table provides a plurality of entries indicating a plurality of EPRE ratios, each EPRE ratio associated with a combination of values that includes a PSS bandwidth and one or more of an SSS bandwidth or a broadcast channel bandwidth.

Aspect 19: The method of aspect 18, wherein the combination of values further includes a first SCS for the PSS and a second SCS for the one or more of the SSS bandwidth or the broadcast channel bandwidth.

Aspect 20: The method of any of aspects 17 through 19, wherein the table provides a plurality of entries indicating a plurality of EPRE ratios, each EPRE ratio associated with an SSB configuration.

Aspect 21: The method of any of aspects 12 through 20, wherein identifying the EPRE ratio between the PSS and the one or more of the SSS or the broadcast channel comprises: calculating the EPRE ratio based at least in part on the first bandwidth, the second bandwidth, and the radio frequency spectrum band in which the UE is operating.

Aspect 22: The method of any of aspects 12 through 21, further comprising: identifying a third bandwidth of the SSB for a third symbol that includes one or more of a second SSS or a second broadcast channel; and identifying a second EPRE ratio between the PSS and the one or more of the second SSS or the second broadcast channel based at least in part on the first bandwidth, the third bandwidth, and the radio frequency spectrum band in which the UE is operating, wherein transmitting the SSB is based at least in part on the identified second EPRE ratio.

Aspect 23: An apparatus for wireless communications at a UE, comprising a processor; memory coupled with the processor; and instructions stored in the memory and executable by the processor to cause the apparatus to perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communications at a base station, comprising a processor; memory coupled with the processor; and instructions stored in the memory and executable by the processor to cause the apparatus to perform a method of any of aspects 12 through 22.

Aspect 27: An apparatus for wireless communications at a base station, comprising at least one means for performing a method of any of aspects 12 through 22.

Aspect 28: A non-transitory computer-readable medium storing code for wireless communications at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying a first bandwidth associated with a primary synchronization signal of a synchronization signal block;
    identifying a second bandwidth associated with one or more of a secondary synchronization signal or a broadcast channel of the synchronization signal block;
    calculating, based at least in part on the first bandwidth associated with the primary synchronization signal, the second bandwidth associated with one or more of the secondary synchronization signal or the broadcast channel, and a radio frequency spectrum band in which the UE is operating, an energy per resource element ratio between the primary synchronization signal and one or more of the secondary synchronization signal or the broadcast channel; and
    receiving the synchronization signal block according to the calculated energy per resource element ratio.

2. The method of claim 1, further comprising:
    identifying a threshold equivalent isotropically radiated power for the radio frequency spectrum band, wherein calculating the energy per resource element ratio is based at least in part on the threshold equivalent isotropically radiated power for the radio frequency spectrum band.

3. The method of claim 2, wherein the threshold equivalent isotropically radiated power for the radio frequency spectrum band is based at least in part on a geographic location of the UE.

4. The method of claim 1, further comprising:
    identifying a threshold power spectral density for the radio frequency spectrum band, wherein calculating the energy per resource element ratio is based at least in part on the threshold power spectral density.

5. The method of claim 4, wherein the threshold power spectral density for the radio frequency spectrum band is based at least in part on a geographic location of the UE.

6. The method of claim 1, wherein calculating the energy per resource element ratio between the primary synchronization signal and one or more of the secondary synchronization signal or the broadcast channel comprises:
    identifying an entry in a table based at least in part on the first bandwidth, the second bandwidth, and the radio frequency spectrum band, wherein the entry indicates the energy per resource element ratio.

7. The method of claim 6, wherein the table provides a plurality of entries indicating a plurality of energy per resource element ratios, each energy per resource element ratio associated with a combination of values that includes a primary synchronization signal bandwidth and one or more of a secondary synchronization signal bandwidth or a broadcast channel bandwidth.

8. The method of claim 7, wherein the combination of values further includes a first subcarrier spacing for the primary synchronization signal and a second subcarrier spacing for one or more of the secondary synchronization signal or the broadcast channel.

9. The method of claim 6, wherein the table provides a plurality of entries indicating a plurality of energy per resource element ratios, each energy per resource element ratio associated with a synchronization signal block configuration.

10. The method of claim 1, wherein calculating the energy per resource element ratio between the primary synchronization signal and one or more of the secondary synchronization signal or the broadcast channel comprises:
    calculating the energy per resource element ratio between the primary synchronization signal and the broadcast channel based at least in part on the first bandwidth associated with the primary synchronization signal, the second bandwidth associated with the broadcast channel, and the radio frequency spectrum band in which the UE is operating.

11. The method of claim 1, further comprising:
    identifying a third bandwidth of the synchronization signal block for a third symbol that includes one or more of a second secondary synchronization signal or a second broadcast channel; and
    identifying a second energy per resource element ratio between the primary synchronization signal and one or more of the second secondary synchronization signal or the second broadcast channel based at least in part on the first bandwidth, the third bandwidth, and the radio frequency spectrum band in which the UE is operating, wherein receiving the synchronization signal block is based at least in part on the identified second energy per resource element ratio.

12. A method for wireless communications at a network entity, comprising:
    identifying a first bandwidth associated with a primary synchronization signal of a synchronization signal block;
    identifying a second bandwidth associated with one or more of a secondary synchronization signal or a broadcast channel of the synchronization signal block;
    calculating, based at least in part on the first bandwidth associated with the primary synchronization signal, the second bandwidth associated with one or more of the secondary synchronization signal or the broadcast channel, and a radio frequency spectrum band in which a user equipment (UE) is operating, an energy per resource element ratio between the primary synchronization signal and one or more of the secondary synchronization signal or the broadcast channel; and
    transmitting the synchronization signal block according to the calculated energy per resource element ratio.

13. The method of claim 12, further comprising:
    identifying a threshold equivalent isotropically radiated power for the radio frequency spectrum band, wherein calculating the energy per resource element ratio is based at least in part on the threshold equivalent isotropically radiated power for the radio frequency spectrum band.

14. The method of claim 13, wherein the threshold equivalent isotropically radiated power for the radio frequency spectrum band is based at least in part on a geographic location of the UE.

15. The method of claim 12, further comprising:
    identifying a threshold power spectral density for the radio frequency spectrum band, wherein calculating the energy per resource element ratio is based at least in part on the threshold power spectral density.

16. The method of claim 15, wherein the threshold power spectral density for the radio frequency spectrum band is based at least in part on a geographic location of the UE.

17. The method of claim 12, wherein calculating the energy per resource element ratio between the primary synchronization signal and one or more of the secondary synchronization signal or the broadcast channel comprises:

identifying an entry in a table based at least in part on the first bandwidth, the second bandwidth, and the radio frequency spectrum band, wherein the entry indicates the energy per resource element ratio.

18. The method of claim 17, wherein the table provides a plurality of entries indicating a plurality of energy per resource element ratios, each energy per resource element ratio associated with a combination of values that includes a primary synchronization signal bandwidth and one or more of a secondary synchronization signal bandwidth or a broadcast channel bandwidth.

19. The method of claim 18, wherein the combination of values further includes a first subcarrier spacing for the primary synchronization signal and a second subcarrier spacing for one or more of the secondary synchronization signal bandwidth or the broadcast channel bandwidth.

20. The method of claim 17, wherein the table provides a plurality of entries indicating a plurality of energy per resource element ratios, each energy per resource element ratio associated with a synchronization signal block configuration.

21. The method of claim 12, wherein calculating the energy per resource element ratio between the primary synchronization signal and one or more of the secondary synchronization signal or the broadcast channel comprises:
calculating the energy per resource element ratio between the primary synchronization signal and the broadcast channel based at least in part on the first bandwidth associated with the primary synchronization signal, the second bandwidth associated with the broadcast channel, and the radio frequency spectrum band in which the UE is operating.

22. The method of claim 12, further comprising:
identifying a third bandwidth of the synchronization signal block for a third symbol that includes one or more of a second secondary synchronization signal or a second broadcast channel; and
identifying a second energy per resource element ratio between the primary synchronization signal and one or more of the second secondary synchronization signal or the second broadcast channel based at least in part on the first bandwidth, the third bandwidth, and the radio frequency spectrum band in which the UE is operating, wherein transmitting the synchronization signal block is based at least in part on the identified second energy per resource element ratio.

23. An apparatus for wireless communications at a user equipment (UE), comprising:
a processor,
memory coupled with the processor; and
instructions stored in the memory and executable by the processor to cause the apparatus to:
identify a first bandwidth associated with a primary synchronization signal of a synchronization signal block;
identify a second bandwidth associated with one or more of a secondary synchronization signal or a broadcast channel of the synchronization signal block;
calculate, based at least in part on the first bandwidth associated with the primary synchronization signal, the second bandwidth associated with one or more of the secondary synchronization signal or the broadcast channel, and a radio frequency spectrum band in which the UE is operating, an energy per resource element ratio between the primary synchronization signal and one or more of the secondary synchronization signal or the broadcast channel; and
receive the synchronization signal block according to the calculated energy per resource element ratio.

24. The apparatus of claim 23, wherein the instructions are further executable by the processor to cause the apparatus to:
identify a threshold equivalent isotropically radiated power for the radio frequency spectrum band, wherein calculating the energy per resource element ratio is based at least in part on the threshold equivalent isotropically radiated power for the radio frequency spectrum band.

25. The apparatus of claim 23, wherein the instructions are further executable by the processor to cause the apparatus to:
identify a threshold power spectral density for the radio frequency spectrum band, wherein calculating the energy per resource element ratio is based at least in part on the threshold power spectral density.

26. The apparatus of claim 23, wherein, to calculate the energy per resource element ratio between the primary synchronization signal and one or more of the secondary synchronization signal or the broadcast channel, the instructions are executable by the processor to cause the apparatus to:
identify an entry in a table based at least in part on the first bandwidth, the second bandwidth, and the radio frequency spectrum band, wherein the entry indicates the energy per resource element ratio.

27. The apparatus of claim 23, wherein the instructions are further executable by the processor to cause the apparatus to:
identify a third bandwidth of the synchronization signal block for a third symbol that includes one or more of a second secondary synchronization signal or a second broadcast channel; and
identify a second energy per resource element ratio between the primary synchronization signal and one or more of the second secondary synchronization signal or the second broadcast channel based at least in part on the first bandwidth, the third bandwidth, and the radio frequency spectrum band in which the UE is operating, wherein receiving the synchronization signal block is based at least in part on the identified second energy per resource element ratio.

28. An apparatus for wireless communications at a network entity, comprising:
a processor,
memory coupled with the processor; and
instructions stored in the memory and executable by the processor to cause the apparatus to:
identify a first bandwidth associated with a primary synchronization signal of a synchronization signal block;
identify a second bandwidth associated with one or more of a secondary synchronization signal or a broadcast channel of the synchronization signal block;
calculate, based at least in part on the first bandwidth associated with the primary synchronization signal, the second bandwidth associated with one or more of the secondary synchronization signal or the broadcast channel, and a radio frequency spectrum band in which a user equipment (UE) is operating, an energy per resource element ratio between the primary synchronization signal and one or more of the secondary synchronization signal or the broadcast channel; and
transmit the synchronization signal block according to the calculated energy per resource element ratio.

29. The apparatus of claim 28, wherein the instructions are further executable by the processor to cause the apparatus to:
identify a threshold equivalent isotropically radiated power for the radio frequency spectrum band, wherein calculating the energy per resource element ratio is based at least in part on the threshold equivalent isotropically radiated power for the radio frequency spectrum band.

30. The apparatus of claim 28, wherein the instructions are further executable by the processor to cause the apparatus to:
identify a threshold power spectral density for the radio frequency spectrum band, wherein calculating the energy per resource element ratio is based at least in part on the threshold power spectral density.

\* \* \* \* \*